United States Patent [19]

Sato et al.

[11] Patent Number: 5,419,132
[45] Date of Patent: May 30, 1995

[54] INERTIAL BODY DRIVE MECHANISM

[75] Inventors: Hitoshi Sato, Tsuchiura; Kazuyuki Ino, Shmodate; Kenichi Kimura, Ushiku, all of Japan

[73] Assignee: Hitachi Construction Machinery Co., Ltd., Tokyo, Japan

[21] Appl. No.: 190,197
[22] PCT Filed: Jul. 14, 1993
[86] PCT No.: PCT/JP93/00977
    § 371 Date: Feb. 8, 1994
    § 102(e) Date: Feb. 8, 1994
[87] PCT Pub. No.: WO94/01682
    PCT Pub. Date: Jan. 20, 1994

[30] Foreign Application Priority Data

Jul. 14, 1992 [JP] Japan ................... 4-209641
Jul. 14, 1992 [JP] Japan ................... 4-209642

[51] Int. Cl.⁶ .................. F16D 31/02; F16D 39/00
[52] U.S. Cl. ........................... 60/468; 60/493; 60/494
[58] Field of Search .......... 91/517, 518; 60/426, 60/493, 468, 464, 494

[56] References Cited

U.S. PATENT DOCUMENTS

| 4,420,935 | 12/1983 | Kobald | 60/452 X |
| 4,628,690 | 12/1986 | Arai et al. | 60/468 X |
| 4,694,647 | 9/1987 | Yoshida | 60/494 X |
| 4,850,192 | 7/1989 | Mitsumasa et al. | 60/494 X |

FOREIGN PATENT DOCUMENTS

| 0232683 | 9/1986 | European Pat. Off. | |
| 0537349 | 6/1991 | European Pat. Off. | |
| 57-1803 | 1/1982 | Japan | |
| 57-25570 | 2/1982 | Japan | |
| 0134064 | 8/1982 | Japan | 60/493 |
| 58-91902 | 6/1983 | Japan | |
| 3-290532 | 12/1991 | Japan | |
| 0714060 | 2/1980 | U.S.S.R. | 60/468 |

OTHER PUBLICATIONS

Patent Abstracts of Japan, vol. 7, No. 189 (M-237) [1334] Aug. 18, 1983 of 58-91902.

*Primary Examiner*—Edward K. Look
*Assistant Examiner*—Hoang Nguyen
*Attorney, Agent, or Firm*—Antonelli, Terry, Stout & Kraus

[57] ABSTRACT

An inertial body drive mechanism which is arranged to prevent a reversing motion of a hydraulic motor 1 after an inertial rotation and which is capable of stopping the hydraulic motor 1 quickly together with an inertial body. An oil chamber 26 of a reversing motion preventive valve 21 and an oil reservoir chamber 34 of an oil suction feeder 32 are communicated with each other through a tank conduit 27 with a throttle 38. Operating oil is supplied into and out of the oil chamber 26 by way of the oil reservoir chamber 34 of the oil suction feeder 32 in relation with displacement of a piston operating in response to oil pressure acting in a pilot chamber 33. When inertial rotation of the hydraulic motor 1 is once stopped, operating oil is supplied from the oil reservoir chamber 34 to the oil chamber 26 thereby sliding the reversing motion preventive valve 21 from a closed position (a) to an open position (b) to prevent reversing motions of the hydraulic motor 1.

11 Claims, 10 Drawing Sheets

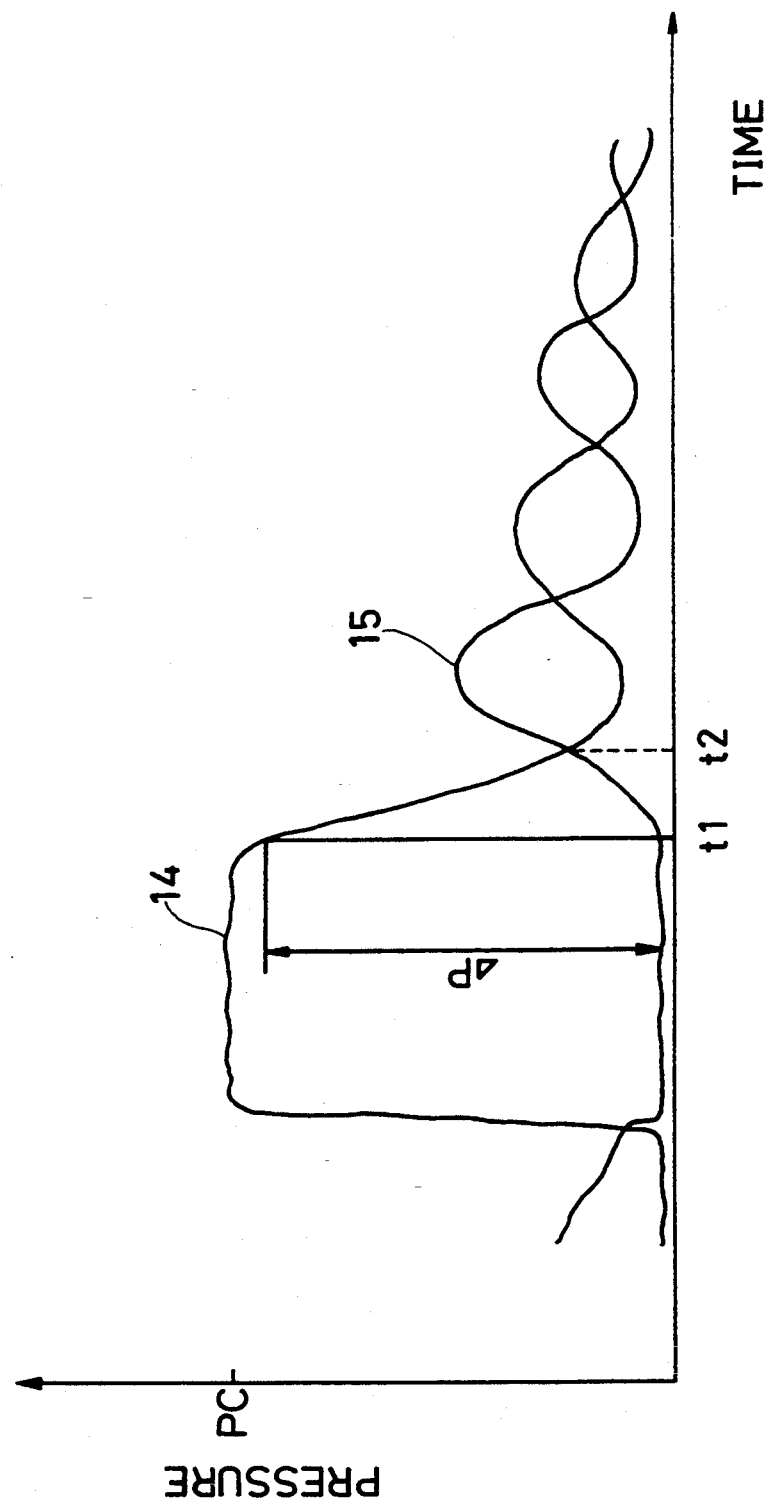

INERTIAL BODY DRIVE MECHANISM

This application is a designated filing under 35 U.S.C. § 371 of PCT/JP93/00977 filed Jul. 14, 1993.

FIELD OF THE INVENTION

This invention relates to an inertial body drive mechanism for use on construction machines such as hydraulic power shovels or the like, and more particularly to a hydraulic inertial body drive mechanism which is arranged to prevent rotational reversing motions of an inertial body which normally take place upon stopping the inertial body.

BACKGROUND OF THE INVENTION

It is the general practice in construction machines like hydraulic power shovels to have an upper rotary body, which is rotatably mounted on a lower mobile vehicular body, rotationally driven from a hydraulic drive circuit which constitutes an inertial body drive mechanism for the upper rotary body.

In this regard, FIGS. 11 and 12 show an example of prior art hydraulic rotational drive circuit of the sort mentioned above, namely, an inertial body drive for rotationally driving a hydraulic power shovel.

In these figures, indicated at 1 is a hydraulic motor for rotational drive, which is connectible to a hydraulic pump 2, which serves as a hydraulic pressure source, and to a tank 3, through conduits 4 and 5 from the pump 2 and the tank 3 and through first and second main conduits 6A and 6B. The hydraulic motor 1 is rotationally driven by charging and discharging the oil pressure which is supplied from the hydraulic pump 2, and as a result the inertial body or the upper rotary body is put in rotation on the lower mobile vehicular body (both upper and lower bodies not shown).

Indicated at 7 is a directional switch valve which is interposed to connect the main conduits 6A and 6B selectively with the conduit 4 from the pump 2 or the conduit 5 to the tank 3. The directional switch valve 7 has its ports on the side of the hydraulic pressure source connected to the hydraulic pump 2 and tank 3 through the pump and tank conduits 4 and 5, and its ports on the side of the motor connected to the hydraulic motor 1 through the first and second main conduits 6A and 6B, respectively. The directional switch valve 7 is provided with a manual lever 7A to be operated by the operator to shift the valve from a neutral position A to either one of left and right drive positions B and C, which control the direction of the oil pressure to be supplied to the motor 1 and from the hydraulic motor 1, namely, the directions of oil pressure flows to and from the hydraulic motor 1. When returned to the neutral position A, the directional switch valve 7 blocks communication of the pump and tank conduits 4 and 5 with the main conduits 6A and 6B to stop oil pressure flows to and from the hydraulic motor 1.

Indicated at 8A and 8B are a pair of charging check valves which are connected to the main conduits 6A and 6B at halfway points between the hydraulic motor 1 and the directional switch valve 7. These check valves 8A and 8B are connected to the tank 3 through an auxiliary conduit 9 and a tank conduit 10 to supply the operating oil in the tank 3 to the main conduits 6A and 6B when a negative pressure is developed in these conduits 6A and 6B, for example, at the time of inertial rotation of the hydraulic motor 1.

Denoted at 11A and 11B are a pair of overload relief valves which are connected to the main conduits 6A and 6B at halfway points between the hydraulic motor 1 and the directional control valve 7. These overload relief valves 11A and 11B are connected to the tank 3 through the auxiliary conduit 9, and at the same time to the oil inlets of the check valves 8A and 8B, respectively. The overload relief valves 11A and 11B are calibrated to open at a predetermined control pressure level PC (see FIG. 12) which is determined by a valve spring 12A or 12B. When an excessive pressure, that is, a pressure in excess of the predetermined control pressure level PC develops in the main conduit 6A (or 6B), for example, at the time of inertial rotation of the hydraulic motor 1, the overload relief valve 11A (11B) is opened to relieve the excessive pressure into the opposite main conduit 6B (6A) through the check valve 8B (8A), thereby limiting the maximum pressure in the main conduits 6A and 6B to the predetermined control level PC.

Indicated at 13 is a drain conduit which is connected to the hydraulic motor 1, the drain conduit 13 serving to return to the tank 3 the drain oil resulting from partial leakage of the pressure oil supplied to the hydraulic motor 1.

In this prior art arrangement, when the directional switch valve 7 is switched from the neutral position A to the drive position B, the oil pressure from the hydraulic pump 2 is supplied to the hydraulic motor 1 through the main conduit 6A to rotationally drive the upper rotary body, which is an inertial body, by the hydraulic power of the motor 1, for example, in the clockwise direction. At this time, the return oil from the hydraulic motor 1 is continuously discharged into the tank 3.

In this state, if the directional switch valve 7 is returned to the neutral position A from the drive position B in order to stop the rotation of the upper rotary body, the supply of oil pressure from the hydraulic pump 2 to the hydraulic motor 1 through the main conduit 6A is blocked, relieving the upper rotary body of the driving force by the hydraulic motor 1.

However, the upper rotary body, which is under the influence of the inertial force as an inertial body, puts the hydraulic motor 1 in inertial rotation to continue its pumping action, so that the pressure oil from the main conduit 6A is discharged into the other main conduit 6B. Then, as the pressure on the side of the main conduit 6A turns to a negative level by the inertial rotation, the operating oil in the tank 3 is replenished into the main conduit 6A through the tank conduit 10 and check valve 8A.

As a result, a relatively large amount of pressure oil is sealed in the main conduit 6B between the hydraulic motor 1 and the directional switch valve 7, thereby generating a braking pressure to stop the inertial rotation of the hydraulic motor 1. As indicated by characteristics curve 14 shown in FIG. 12, the overload relief valve 11B is opened against the action of the spring 12B as soon as the braking pressure exceeds the control pressure level PC at which the overload relief valve 11B is designed to be opened, relieving the braking pressure in the main conduit 6B into the main conduit 6A through the auxiliary conduit 9 and check valve 8A. Consequently, the inertial rotation of the hydraulic motor 1 is gradually braked, and the hydraulic motor 1 as well as the upper rotary body comes to a stop at a time point t1 (FIG. 12) when the overload relief valve 11B is closed by the action of the spring 12B.

In case of the above-described prior art, a braking pressure is produced in the main conduit 6B by the inertial rotation of the hydraulic motor 1, causing the overload relief valve 11B to open for braking the inertial rotation of the hydraulic motor 1. After braking the inertial rotation, the overload relief valve 11B is closed at a time point t1 as shown in FIG. 12, so that, once the hydraulic motor 1 is stopped, the pressure in the main conduit 6B is at a relatively high level as indicated by the characteristics curve 14 in FIG. 12. On the other hand, the pressure in the main conduit 6A remains at a low level until the time point t1 as indicated by the characteristics curve 15 in FIG. 12.

Therefore, according to the prior art, even if the hydraulic motor 1 is once stopped at the time point t1 of FIG. 12, it is likely that a relative large pressure differential ΔP exists between the main conduits 6B and 6A as indicated by the characteristics curves 14 and 15. Due to this pressure differential ΔP, the hydraulic motor 1 tends to rotate in a reverse direction, namely, in a direction reverse to the direction of the above-mentioned inertial rotation, and as a result the oil pressure starts to flow toward the main conduit 6A from the main conduit 6B in such a way as to diminish the pressure differential ΔP gradually.

However, at this time, despite the gradual diminishment of the pressure differential ΔP, inertial force of reverse direction is applied to the upper rotary body by the reverse rotation of the hydraulic motor 1, and as a result the hydraulic motor 1 continues its reverse rotation. Therefore, this time the pressure in the main conduit 6A, indicated by the characteristics curve 15 of FIG. 12, becomes higher than the pressure in the main conduit 6B of the characteristics curve 14 at the time point t2, putting the hydraulic motor 1 in rotation again in a reversed direction.

In this manner, according to the prior art, at the time point t1 which coincides with the end of the open phase of the overload relief valve 11B (11A), the hydraulic motor 1 which has been in an inertial rotation is temporarily stopped by the increase of the pressure differential ΔP between the main conduits 6A and 6B. However, then the hydraulic motor 1 begins to rotate again in a reversed direction, thereafter repeating the reversed rotations together with the upper rotary body.

In order to solve this problem, a number of proposals have been made, for example, as in Japanese Laid-Open Patent Specifications 57-25570 and 58-91902, employing a swingback preventive valve in each of the main conduits which are connected to the hydraulic motor, thereby to prevent the swingback motions of the inertial body. In this case, however, the swingback preventive valve has to be provided separately in each of the first and second main conduits, giving rise to a number of problems such as a marked increase in the number of component parts required and complication of the piping work, in addition to the problem that the hydraulic circuit as a whole becomes objectionably large in size. Further, the prior art swingback preventive valves for the inertial body are each in the form of a poppet valve, which maintains a closed state by holding a valve body substantially in linear contact with a valve seat, so that it can be inadvertently opened even by slight fluctuations in the drive pressure of the hydraulic motor in the braking pressure, hindering smooth drive or stop motions of the inertial body.

Further, in this connection, Japanese Laid-Open Patent Specification 57-1803 discloses an apparatus for preventing reversing motions of the inertial body, including a spool type on-off valve located between first and second main conduits which are connected to a hydraulic motor, a pair of oil chambers formed at the opposite ends of the spool of the on-off valve, and a pair of springs provided in the respective oil chambers to bias the spool toward a neutral position, a pressure (pilot pressure) from the main conduits being introduced into the respective oil chambers through a throttle.

In this case, however, either the hydraulic motor drive pressure which is produced in one of the main conduits or the braking pressure which is produced in the other main conduit continuedly acts in the oil chamber of the on-off valve as a pilot pressure through the above-mentioned throttle. Therefore, regardless of the reversing motions of the hydraulic motor caused by the inertial body, the spool of the on-off valve can be opened against the action of the spring when the pilot pressure from the main conduit becomes higher. It follows that the on-off valve disclosed in the above-mentioned Japanese Laid-Open Patent Specification No. 57-1803 has possibilities of hindering smooth operations in driving and stopping the inertial body, failing to provide improvements in reliability and safety of the reverse motion preventive apparatus for the inertial body.

In view of the above-discussed problems or drawbacks of the prior art, it is an object of the present invention to provide a hydraulic inertial body drive mechanism including a valve for preventing reversing motions of an inertial body, the inertial body drive mechanism being arranged to prevent effectively the repeated reversing motions of a hydraulic motor which would normally take place after stopping inertial rotation of the hydraulic motor, thereby enhancing the degree of safety and reliability of operation while reducing the number of component parts to simplify the construction of the drive mechanism as a whole.

DISCLOSURE OF THE INVENTION

According to the present invention, in order to solve the above-stated objectives, there is provided an inertial body drive mechanism of the type including: a hydraulic pressure source; a hydraulic motor adapted to drive an inertial body by charging and discharging oil pressure supplied from the hydraulic pressure source; a switch valve connected to the hydraulic motor through first and second main conduits and being switchable from a neutral position to a drive position to supply oil pressure from the hydraulic pressure source to the hydraulic motor, blocking the supply of oil pressure to the hydraulic motor when returned to the neutral position; and a pressure control valve interposed between the first and second main conduits at a position between the switch valve and the hydraulic motor to limit the maximum pressure in the first and second main conduits to a first predetermined control level; characterized in that the inertial body drive mechanism comprises:

a valve means interposed between the first and second main conduits and having a spool arranged to slide between an open position and a closed position for establishing and blocking communication between the first and second main conduits, along with a biasing means urging the spool toward the closed position and an oil chamber for sliding the spool from the closed position toward the open position;

a pressurized oil supply means having an oil reservoir chamber of variable volume in communication with the oil chamber of the valve means and adapted to supply the oil in the oil reservoir chamber to the oil chamber of the valve means in a pressurized state when the pressure in either the first or the second main conduit, whichever is at a higher level, drops below a second predetermined control level lower than the above-mentioned first control level; and a flow resistant means located within the length of an oil passage connecting either one of the oil reservoir chamber of the pressurized oil supply means and the oil chamber of the valve means to the tank to impose throttling effects on discharge oil flows to the tank.

With the foregoing arrangements, in case a braking pressure is produced in one of the first and second main conduits at the time of inertial rotation of the hydraulic motor, it is applied to the pressure control valve to open same, thereby limiting the pressure in the main conduit at a higher level to the first predetermined control level, while permitting the pressurized oil supply means to hold the operating oil in the oil reservoir chamber. In this state, the oil chamber of the valve means is retained at a low pressure level without supply of the operating oil, so that the spool of the valve means is retained in the closed position by the biasing means to block continuedly the communication between the first and second main conduits.

In this instance, as soon as the braking pressure drops below the afore-mentioned first operating level, causing the pressure control valve to close, and the inertial rotation of the hydraulic motor is once stopped, the hydraulic motor tends to start a reverse rotation. However, by this time the braking pressure becomes lower than the second predetermined control level, so that the operating oil in the oil reservoir chamber of the pressurized oil supply means is fed in a pressurized state to the oil chamber of the valve means, thereby causing the spool of the valve means to slide into the open position against the action of the biasing means. As a result, the first and second main conduits are communicated with each other, diminishing the pressure differential between these conduits to prevent the reversing motion of the hydraulic motor.

Further, at this time the spool which is urged by the biasing means toward the closed position on the side of the oil chamber discharges the operating oil in the oil chamber into the tank through an oil passage including the above-mentioned flow resistant means. Accordingly, the spool is allowed to maintain the open state over a relatively long time period to diminish the pressure differential between the first and second main conduits in an assured manner.

Further, the spool of the valve means, which is put in sliding displacement by the pressurized oil applied to its oil chamber from the oil reservoir chamber of the pressurized oil supply means, has an insensitive region over a predetermined length between the closed and open positions. Therefore, fluctuations in the drive pressure of the hydraulic motor or in the braking pressure can be absorbed by the oil reservoir chamber of the pressurized oil supply means, if any, so that there is no possibility of the spool being displaced to any material degree by slight volumetric variations of the oil reservoir chamber, preventing inadvertent communications between the first and second main conduits.

In this instance, a high pressure selector valve is interposed between the first and second main conduits at a position between the switch valve and the hydraulic motor, thereby to select the pressure in the first or second conduit whichever is at a higher level, for supply as a pilot pressure to a pilot chamber of the afore-mentioned pressurized oil supply means. In this case, the pressurized oil supply means is preferred to be arranged to suck and store oil in the oil reservoir chamber when the pilot pressure in its pilot chamber exceeds the above-mentioned second control level, and to supply the oil in the oil reservoir chamber to the oil chamber of the valve means after pressurization when the pilot pressure becomes below the second control level.

Furthermore, a check valve may be provided within the length of the above-mentioned oil conduit in parallel relation with the flow resistant means, the check valve permitting the oil in the tank to flow toward the oil chamber while blocking reverse oil flows. This arrangement ensures smooth oil flows toward the oil chamber or toward the oil reservoir chamber to prevent development of a negative pressure in the oil chamber and in the oil reservoir chamber in an assured manner.

On the other hand, in the inertial body drive mechanism according to the present invention, the above-described valve means may be constituted by: a spool sliding bore formed in a casing; a pair of ports formed in the casing in spaced positions in the axial direction of the spool sliding bore in communication with the first and second main conduits; a spool slidably fitted in the spool sliding bore; a throttle passage formed on the spool to establish and block communication between the paired ports; an oil chamber formed between one end of the spool and the casing and connected to the tank through the above-mentioned oil conduit; and a valve spring charged between the other end of the spool and the casing and serving as a biasing means urging the spool toward the oil chamber.

In the above arrangements, the pressurized oil supply means is preferred to be constituted by: a piston sliding bore formed in a casing; a piston slidably fitted in the piston sliding bore; an oil reservoir chamber formed by the piston at one end of the piston sliding bore in communication with the oil chamber; a set spring provided at the other end of the piston for biasing same toward the oil reservoir chamber with a spring force corresponding to the second predetermined control pressure level; and a pilot pressure section provided at one end of the piston and adapted to slide the piston against the action of the set spring to draw the operating oil into the oil reservoir chamber when the pressure in either the first or the second main conduit, whichever is at a higher level, exceeds the second control pressure level.

The valve spring of the above-mentioned valve means is preferably arranged to have a weaker spring force than the set spring of the pressurized oil supply means.

With the foregoing arrangements, in the event either the driving pressure of the hydraulic motor or the braking pressure rises above the second control pressure level, the piston of the pressurized oil supply means is displaced by the pilot pressure section against the action of the set spring, increasing the volume of the oil reservoir chamber and thereby sucking the operating oil into the oil reservoir chamber from the oil chamber of the valve means. As a result, the oil chamber is turned into a low pressure level, and the spool in the casing is held in the closed position by the action of the valve spring urging the spool to slide toward the oil chamber, securely blocking communication between the respective ports in the casing. Once the inertial rotation of the hydraulic motor is stopped and if at this time the braking pressure drops below the second predetermined control level, the piston is pushed toward the oil reservoir chamber by the set spring of the pressurized oil supply means to supply the operating oil in the oil reservoir chamber to the oil chamber of the valve means after pressurization. As a consequence, the spool of the valve means is slid for displacement into the open position against the action of the valve spring, communicating the respective ports with each other through the throttle passage on the spool to prevent reversing motions of the inertial body.

In this instance, the valve means and the pressurized oil supply means are built into one and same casing, which is preferably provided with a spool sliding bore and a pair of ports, serving as part of the valve means, along with a piston sliding bore, serving as part of the pressurized oil supply means, in a position spaced from the spool sliding bore and the respective ports.

Besides, a check valve is preferably provided within the length of the oil conduit in parallel relation with the flow resistant means, thereby permitting the operating oil in the tank to flow toward the oil chamber while blocking reverse oil flows.

Moreover, in the inertial body drive mechanism according to the present invention, the valve means may be constituted by: a spool sliding bore formed in a casing; a pair of ports formed in the casing in spaced positions in the axial direction of the spool sliding bore and in communication with the first and second main conduits; a spool externally defining a cylindrical valve body to be slidably fitted in the spool sliding bore and internally defining a piston sliding bore on the inner periphery thereof; a throttle passage for establishing and blocking communication between the ports in relation with sliding displacement of the spool; an oil chamber formed between one end of the spool and the casing; and a biasing means urging the spool toward the oil chamber.

The above-mentioned pressurized oil supply means is preferably constituted by: a piston slidably fitted in the piston sliding bore in the spool; an oil reservoir chamber formed by the piston at one end of the piston sliding bore in constant communication with the oil chamber; a set spring located between the other end of the piston and the casing to urge the piston constantly toward the oil reservoir chamber with a spring force corresponding to the second preset control level; and a pilot pressure section provided in association with one end of the piston to slide the piston against the action of the set spring to suck the oil into the oil reservoir chamber when the pressure in either the first or second main conduit, whichever is at a higher level, exceeds the second preset control level.

The valve spring of the above-mentioned valve means is preferably constituted by a spring located between the other end of the spool and the piston and arranged to have a weaker spring force than the set spring.

With the arrangements having the spool in the form of a hollow cylinder fitted in the spool sliding bore of the casing and having the piston fitted in the piston sliding bore within the spool in this manner, it becomes possible to minimize the pressure receiving area on the part of the pilot pressure section and as a result to minimize correspondingly the spring force of the above-mentioned set spring. Accordingly, the pressurized oil supply means can be accommodated in the valve means in a compact form, permitting to reduce the size of the drive mechanism as a whole to a significant degree.

In this instance, the oil reservoir chamber is preferred to be located in a position radially inward of the oil chamber between one end of the piston and the casing.

Preferably, the throttle passage is bored radially into the spool and constituted by at least one pair of oil holes which are formed in spaced positions in the axial direction of the spool and an axial oil groove which is formed on the circumference of the piston in such a manner as to intercommunicate the two oil holes.

In this instance, the oil holes of the spool are brought into and out of communication with the oil groove on the piston by relative displacements of the spool and piston, making it possible to enlarge the insensitive region between the open position which communicates the valve ports with each other through the throttle passage and the closed position which blocks the communication between the valve ports, thereby securely preventing inadvertent communications of the valve ports.

On the other hand, the pilot pressure section can be constituted by a pusher fitted slidably in one end of the piston, and a pilot chamber formed in the piston in association with the pusher and supplied with oil pressure from either the first or second main conduit, whichever is at a higher pressure level, through the high pressure selector valve.

Further, the pilot pressure section can be constituted by a pusher slidably fitted in one end of the casing, and a pilot chamber formed in the casing in association with the pusher and supplied with oil pressure from either the first or second main conduit, whichever is at a higher pressure level, through the high pressure selector valve.

BRIEF DESCRIPTION OF THE DRAWINGS

In the accompanying drawings:

FIG. 12 is a characteristics curve diagram of main conduits involving repeated reversing motions of the hydraulic motor.

BEST MODE FOR CARRYING OUT THE INVENTION

Hereafter, the invention is described more particularly by way of its preferred embodiments shown in FIGS. 1 through 10. In the following description of various embodiments, those component parts which are common with the conventional counterpart of FIG. 11 are designated by common references and their explanations are omitted to avoid repetitions.

Figure 1:
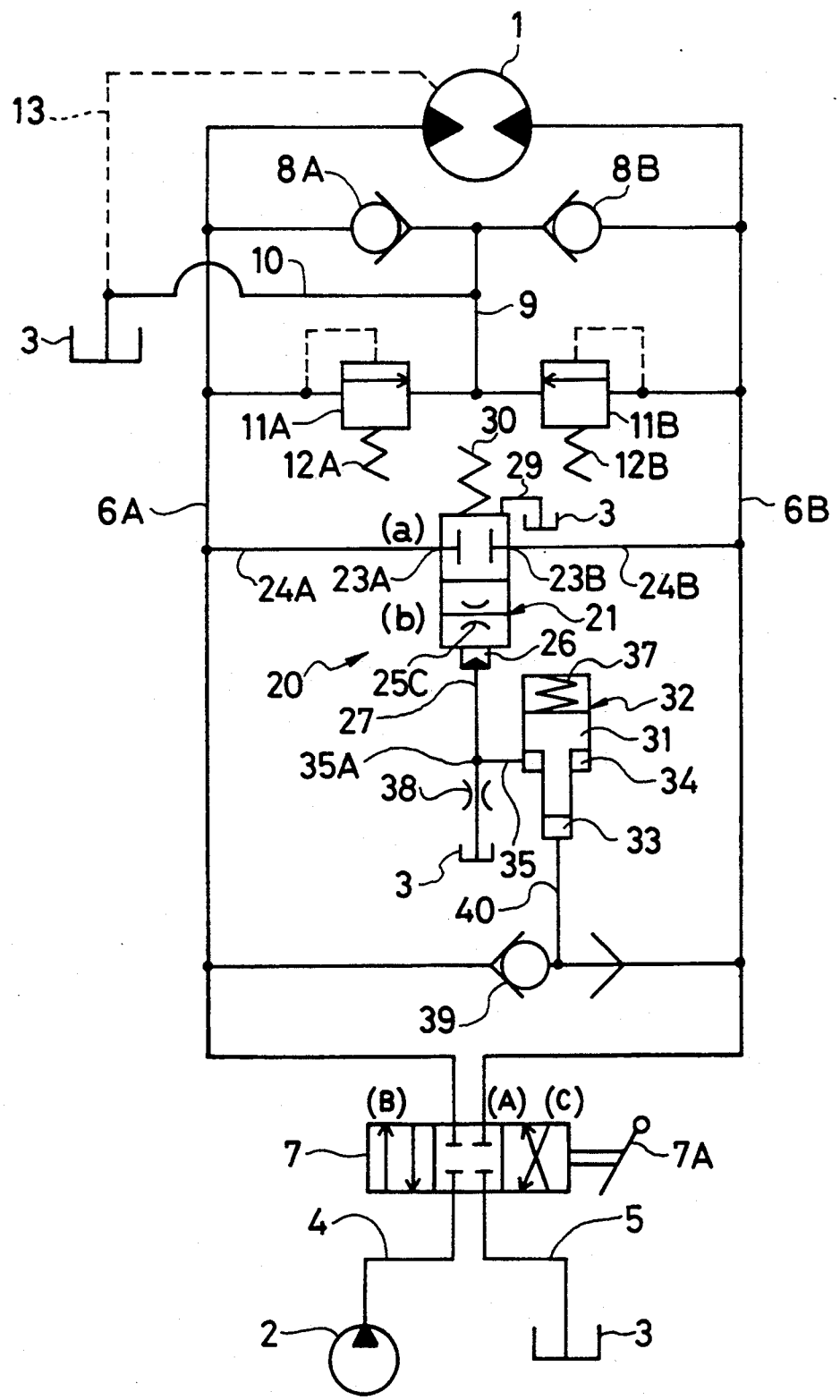
FIG. 1 is a diagrammatic illustration of a hydraulic rotational drive circuit in a first embodiment of the present invention, the hydraulic circuit including a valve for preventing reversing motions of an inertial body.
Figure 2:
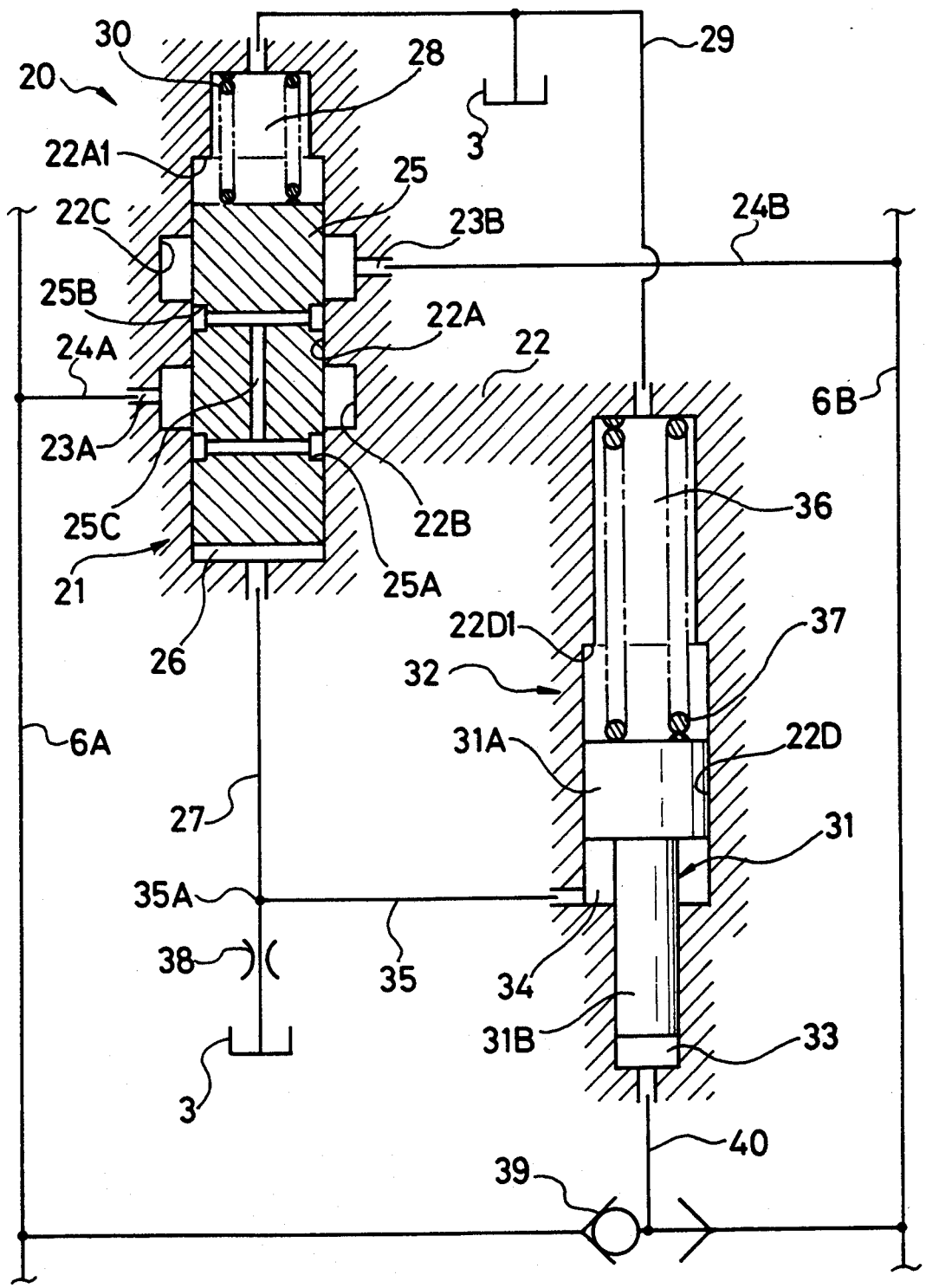
FIG. 2 is a diagrammatic longitudinal section of the reversing motion preventive valve in FIG. 1, showing a spool of the valve as returned to its closed position.

Referring to FIGS. 1 and 2, there is shown a first embodiment of the invention.

In these figures, indicated at 20 is a valve assembly which is employed in this embodiment for preventing reversing motions of an inertial body, and which is constituted by a reversing motion preventive valve 21 serving as a valve means as will be described hereinlater and an oil suction feeder 32 serving as a pressurized oil supply means.

The reversing motion preventive valve 21, serving as the aforementioned valve means, is provided between main conduits 6A and 6B of a hydraulic motor 1, and is in the form of a spool type switch valve, namely, a 2-port and 2-position spool valve which is built into a valve casing 22 along with an oil suction feeder 32 as will be described hereinlater. In this instance, as shown particularly in FIG. 2, the valve casing 22 is internally provided with an axial spool sliding bore 22A, annular oil grooves 22B and 22C which are located radially on the outer side of the spool sliding bore 22A and spaced from each other by a predetermined distance in the axial direction, and a pair of ports 23A and 23B which are constantly in communication with the oil grooves 22B and 22C, respectively. The valve casing 22 is provided in a motor casing (not shown) of the hydraulic motor 1, along with charging check valves 8A and 8B and overload relief valves 11A and 11B. The ports 23A and 23B of the valve casing 22 are connected to the main conduits 6A and 6B through bypass passages 24A and 24B, respectively, each at a point between the hydraulic motor 1 and directional switch valve 7.

The valve casing 22 is further provided with a piston sliding bore 22D, which is in the form of a stepped bore as seen in FIG. 2, in a position spaced from the spool sliding bore 22A. The piston sliding bore 22D constitutes the oil suction feeder 32 together with a piston 31 which will be described hereinlater. The piston sliding bore 22D communicates with the spool sliding bore 22A within the valve casing 22 through a tank conduit 27 and branch conduit 35 as will be described later. Further, the valve casing 22 is provided with an annular stepped portion 22A1 at the other end of the spool sliding bore 22A, and also with an annular stepped portion 22D1 at the other end of the piston sliding bore 22D. These annular stepped portions 22A1 and 22D1 serve to delimit the stroke ends of the spool 25 and piston 31 as will be described hereinlater.

The spool 25 is slidably fitted in the spool sliding bore 22A and formed in a cylindrical shape with an outside diameter corresponding to the diameter of the spool sliding bore 22A. The spool 25 is circumferentially formed with a pair of annular grooves 25A and 25B in axially spaced positions. Further, the spool 25 is internally formed with a throttle passage 25C between the annular grooves 25A and 25B in the shape of the letter "H". When the spool 25 is in its open position, the ports 23A and 23B are communicated with each other by the throttle passage 25C and the annular grooves 25A and 25B through the oil grooves 22B and 22C. The spool 25 is constantly biased toward its closed position by a valve spring 30, which will be described later, away from its open position where the spool is abutted against the annular stepped portion 22A1 of the valve casing 22.

Denoted at 26 is an oil chamber which is formed between the end face at one end of the spool 25 and the valve casing 22. The oil chamber 26 is connected to the tank 3, which holds the operating oil, through an oil passage labelled as the tank conduit 27, and at the same time to the oil reservoir chamber 34 through a branch conduit 35. Upon charging and discharging oil pressure into and out of the oil chamber 26, the spool 25 is slid to shift its position between the open and closed positions.

The reference 28 designates a spring chamber which is formed between the end face at the other end of the spool 25 and the valve casing 22. The spring chamber 28 is connected to the tank 3 together with spring chamber 36 of the oil suction feeder 32 through a common conduit 29, so that low pressure operating oil constantly prevails in these spring chambers.

Indicated at 30 is a valve spring which is employed as a biasing means acting on the end face at other end of the spool 25. The valve spring 30 is arranged to bias the spool 25 constantly toward the oil chamber 26 with a relatively weak spring force to return the spool 25 to the closed position as exemplified in FIG. 2.

Thus, the reversing motion preventive valve 21, which serves as the valve means, is constituted by: the spool sliding bore 22A which is provided within the casing 22; a pair of ports 23A and 23B which are formed in the casing 22 in spaced positions in the axial direction of the spool sliding bore 22A and in communication with the first and second main conduits 6A and 6B; the spool 25 slidably fitted in the spool sliding bore 22A; the throttle passage 25C formed in the spool 25 to establish and block communication between the ports 23A and 23B; the oil chamber 26 provided between one end of the spool 25 and the valve casing 22 and connected to the tank 3 through the tank conduit 27; and the valve spring 30 interposed between the other end of the spool 25 and the valve casing 22 to bias the spool 25 constantly toward the oil chamber 26.

The reference 31 denotes a piston which is fitted in the piston sliding bore 22D of the valve casing 22 to constitute an oil suction feeder 32 which serves as the pressurized oil supply means. The piston 31 is in the form of a stepped cylinder with a large diameter portion 31A and a small diameter portion 31B. The end face at the fore end of the small diameter portion 31B defines within the piston sliding bore 22D a pilot oil chamber 33 serving as the pilot section to be connected to a pilot conduit which will be described later. The large diameter portion 31A of the piston 31 defines an annular oil reservoir chamber 34 around the small diameter portion 31B within the piston sliding bore 22D. The volume of (the amount of reservoir oil in) the oil reservoir chamber 34 is varied by a sliding displacement of the piston 31. The oil reservoir chamber 34 is constantly communicated with the tank 3 and oil chamber 26 through an oil conduit or branch conduit 35 and tank conduit 27. The branch conduit 35 is branched off the tank conduit 27 at a diverging point 35A between the oil chamber 26 and a throttle 38 which will be described later.

Indicated at 36 is another spring chamber which is formed between the large diameter portion 31A of the piston 31 and the valve casing 22. The spring chamber 36 is connected to the tank 3 through a common conduit 29 and filled with operating oil of low pressure. The reference 7 denotes a set spring or a pressure setting spring which is fitted in the spring chamber 36 in abutting engagement with the large diameter portion 31A of the piston 31. The set spring 37 constitutes the oil suction feeder 32 in cooperation with the piston 31, constantly biasing the piston 31 toward the pilot chamber 33.

In this instance, the set spring 37 is adjusted to have a spring force corresponding to 75–85% of the control pressure PC at which the overload relief valves 11A and 11B are opened, permitting the piston 31 to slide toward the annular stepped portion 22D1 as far as its stroke end position when the pilot pressure in the pilot chamber 33 exceeds a second preset control level (hereinafter referred to as "preset level") which corresponds, for example, to about $0.85 \times PC$. At this time, the oil suction feeder 32 sucks oil into the oil reservoir chamber 34 from the oil chamber 26 and tank 3 through the branch conduit 35 and tank conduit 27, thereby filling and storing a relatively large amount of oil in the oil reservoir chamber 34.

When the pilot pressure in the pilot chamber 33 drops below the above-mentioned preset level, the set spring 37 pushes the piston 31 toward the oil reservoir chamber 34 thereby pressurizing the oil in the oil reservoir chamber 34 by the piston 31 while supplying the pressurized oil to the oil chamber 26 through the branch conduit 35 and tank conduit 27. At this time, part of the supplied oil is discharged through the tank conduit 27, but this discharge oil flow is restricted by the throttle 38 which is provided within the length of the tank conduit 27, permitting a large amount of oil to be supplied to the oil chamber 26. The pressurized oil prevailing in the oil chamber 26 acts on the end face of the spool 25, urging the pool 25 to slide toward its stroke end position within the spool sliding bore 22A against the action of the valve spring 30. As a result, the spool 25 communicates the ports 23A and 23B with each other through the throttle passage 25C to switch the reversing motion preventive valve 21 from the closed position (a) to the open position (b) of FIG. 1.

Thus, in this instance, the oil suction feeder 32, which serves as the pressurized oil supply means, is constituted by: the piston sliding bore 22D provided in the valve casing 22; the piston 31 slidably fitted in the piston sliding bore 22D; the oil reservoir chamber 34 defined by the piston 31 at one end of the piston sliding bore 22D in communication with the oil chamber 26; the set spring 37 located in association with the other end of the piston 31 to urge the piston 31 constantly toward the oil reservoir chamber 34 with a spring force corresponding to the second preset control level; and the pilot chamber 33 provided in association with one end of the piston 31 to form the pilot section for slidingly displacing the piston 31 to suck oil into the oil reservoir chamber 34 when the pressure in either the first or second main conduit 6A or 6B, whichever is at a higher level, exceed the afore-mentioned preset control level.

Indicated at 38 is a throttle which is provided within the length of the tank conduit 27 between the diverging point 35A of the branch conduit 35 and the tank 3. This throttle 38 functions to produce throttling effects to restrict the flow rate of discharge oil which tends to flow out of the oil chamber 26 toward the tank 3 through the tank conduit 27, thereby prolonging the time duration over which the spool 25 returns to the closed position from its stroke end position. As a result, there occurs a predetermined time delay to the reversing motion preventive valve 21 when it returns to the closed position (a) from the open position (b), letting the main conduits 6A and 6B communicate with each other over a relatively long time period through the bypass conduits 24A or 24B and the port 23A or 23B.

The reference 39 denotes a high pressure selector valve in the form of a shuttle valve which is interposed between the main conduits 6A and 6B at a position between the hydraulic motor 1 and the directional switch valve 7. This shuttle valve 39 is adapted to select the pressure in either the main conduit 6A or 6B which is at a higher level and connect the selected main conduit to the pilot chamber 33 through the pilot conduit 40 for supplying high oil pressure to the pilot chamber 33 as a pilot pressure.

The rotational drive circuit for hydraulic power shovel or the like, which is arranged in the above-described construction according to the invention, has no great differences from the conventional counterparts in that the upper inertial rotary body can be rotated clockwise or counterclockwise directions by the hydraulic motor 1 upon switching the directional switch valve 7 from the neutral position (A) to the drive position (B) or (C), and the rotation of the hydraulic motor 1 can be stopped upon returning the directional switch valve 7 to the neutral position (A).

Described in greater detail below is the operation by the reversing motion preventive valve 21.

Firstly, as the directional switch valve 7 in the neutral position (A) is switched to the drive position (B) to rotate the upper rotary body by the hydraulic motor 1, the high oil pressure flowing through the main conduit 6A is supplied to the pilot chamber 33 by the shuttle valve 39 as a pilot pressure of high level. Consequently, under the influence of this pilot pressure, the piston 31 of the oil suction feeder 32 is put in a sliding displacement to its stroke end position against the action of the set spring 37 to increase the volume of the oil reservoir chamber 34. By so doing, the oil suction feeder 32 draws oil from the oil tank 3 into the oil reservoir chamber 34 through the tank conduit 27 and branch conduit 35. In the meantime, the spool 25 within the spool sliding bore 22A is urged toward the oil chamber 26 by the valve spring 30 to hold the reversing motion preventive valve 21 in the closed position (a) shown in FIG. 1.

When the directional switch valve 7 is returned from the drive position (B) to the neutral position (A), the hydraulic motor 1 is put in inertial rotation by the upper inertial rotary body to produce a braking pressure, for example, in the main conduit 6B to open the overload relief valve 11B. At this time, since the pressure in the main conduit 6B is increased to the level of the preset control pressure PC of the overload relief valve 11B, the pressure in the main conduit 6B is supplied to the pilot chamber 33 as a pilot pressure which is higher than the preset pressure of the set spring 37. Therefore, in the same manner as in the above-described operation, the oil suction feeder 32 causes the piston 31 to slide into its stroke end position, continuously charging a large amount of oil into the oil reservoir chamber 34 while holding the reverse motion preventive valve 21 still in the closed position (a).

In this instance, at the moment when the shuttle valve 39 is switched to select the braking pressure of the main conduit 6B instead of the driving pressure of the main conduit 6A, for example, the pilot pressure to the pilot chamber 33 may instantaneously drop below the preset pressure of the set spring 37. On such an occasion, a small amount of oil is fed to the oil chamber 26 from the oil reservoir chamber 34 of the oil suction feeder 32, causing the spool 25 to move slightly in the upward direction within the spool sliding bore 22A. However, since the spool 25 is provided with an insensitive zone between the oil grooves 22B and 22C and the annular grooves 25A and 25B, there is no possibility of the main conduits 6A and 6B being inadvertently communicated with each other.

The inertial rotation of the hydraulic motor 1 once comes to a stop at the moment when the overload relief valve 11B is closed after being opened to brake the inertial rotation of the hydraulic motor 1. At this time, a pressure differential ΔP occurs between the main conduits 6A and 6B as exemplified in FIG. 12, so that the hydraulic motor 1 tends to rotate in the reverse direction under the influence of the pressure differential ΔP. However, as the hydraulic motor 1 starts a reverse rotation, the pressure in the main conduit 6B is leaked from the hydraulic motor 1 and discharged into the tank 3 through the drain conduit 13. Consequently, the pressure in the main conduit 6B drops to a level which is, for example, 75%-85% lower than the control pressure PC of the overload relief valve 11B.

As a result, the pilot pressure in the pilot chamber 33 drops to a level below the preset control level of the set spring 37, and the piston 31 of the oil suction feeder 32 is pushed toward the oil reservoir chamber 34 by the action of the set spring 37. Therefore, the piston 31 pressurizes the oil in the oil reservoir chamber 34 while supplying pressurized oil to the oil chamber 26 through the branch conduit 35 and the tank conduit 27. At this time, the throttle 38 restricts the discharge oil flow to the tank 3. The oil pressure which has been introduced into the oil chamber 26 urges the spool 25 to displace to the stroke end position within the spool sliding bore 22A against the action of the valve spring 30. By so doing, the spool 25 communicates the ports 23A and 23B with each other through the throttle passage 25C, switching the reversing motion preventive valve 21 to the open position (b) from the closed position (a) of FIG. 1.

After this, the spool 25 of the reversing motion preventive valve 21 is pushed away from the stroke end position toward the oil chamber 26 by the action of the valve spring 30, letting the oil in the oil chamber 26 flow into the tank 3 through the tank conduit 27. However, at this time, the throttle 38 which is provided in the course of the tank conduit 27 produces throttling effects on the oil flows from the oil chamber 26 to the tank 3 through the tank conduit 27 thereby to restrict the flow rate of the discharge oil from the oil chamber 26. Accordingly, it is possible to prolong to a suitable extent the time duration over which the spool 25 is returned to the closed position from the stroke end position, namely, the time duration over which the reversing action preventive valve 21 is returned to the closed position (a) from the open position (b) of FIG. 1, permitting to communicate the main conduits 6A and 6B with each other over a relatively long time period through the bypass conduits 24A and 24B and the ports 23A and 23B.

Thus, according to the present embodiment, when the inertial rotation of the hydraulic motor 1 is stopped, the spool 25 can be held in the open position (b) over a relatively long time period while the spool 25 is being returned from the open position (b) to the closed position (a) under the influence of the valve spring 30. As a consequence, it becomes possible, for example, to let the high pressure in the main conduit 6B escape to the side of the main conduit 6A through and under the throttling effects of the throttle passage 25C to suppress in a reliable manner the pressure differential ΔP (FIG. 12) which occurs between the main conduits 6A and 6B as discussed hereinbefore in connection with the prior art counterpart, thereby effectively preventing the repeated reversing motions of the hydraulic motor 1.

Then, as the spool 25 is gradually pushed toward the oil chamber 26 until it reaches the closed position exemplified in FIG. 2, the ports 23A and 23B are moved away from the annular grooves 25A and 25B of the spool 25 and finally closed by the circumferential surfaces of the spool 25. Consequently, the communication between the main conduits 6A and 6B is blocked by the anti-reversal valve body 21 of the reversing motion preventive valve 20 to hold the hydraulic motor 1 at rest in a secure manner, while securely preventing the anti-reversal valve 21 from opening inadvertently upon subsequently re-starting the hydraulic motor 1.

Namely, the sliding displacement of the spool 25 within the spool sliding bore 22A of the valve casing 22 contains an insensitive zone of a predetermined stroke length up to a position where the annular grooves 25A and 25B come into communication with the oil grooves 22B and 22C of the valve casing 22. Therefore, at the time of starting or stopping the hydraulic motor 1, a small amount of oil may be supplied to the oil chamber 26 of the anti-reversal valve 21 from the oil reservoir chamber 34 due to fluctuations in the driving or braking pressure, which cause fluctuations in the pilot pressure prevailing in the pilot chamber 33 of the oil suction feeder 32. However, in such a case, the spool 25 is moved upward within the spool sliding bore 22A only in a slight degree, so that the annular grooves 25A and 25B are continuedly blocked against communication with the oil grooves 22B and 22C to preclude inadvertent opening of the anti-reversal valve 21 in a reliable manner.

The preceding description deals with a case where a large amount of oil is leaked from the hydraulic motor 1. In case the oil leak from the hydraulic motor 1 takes place only in a relatively small amount, it is likely for the hydraulic motor 1 to start a reverse rotation upon stopping its inertial rotation, due to a pressure differential ΔP which exists between the main conduits 6A and 6B. In this case, however, a slight reversed rotation of the hydraulic motor 1 causes the pressure (braking pressure) in the main conduit 6B (or 6A), which was at a high level before the reversed rotation, to drop immediately to a level below the preset control level of the set spring 37. Therefore, by the displacement of the piston 31, the operating oil is supplied to the oil chamber 26, and the main conduits 6A and 6B are communicated with each other by the spool 25, immediately preventing further reverse rotation of the hydraulic motor 1.

Thus, according to the present embodiment, upon stopping inertial rotation of the hydraulic motor 1, pressurized oil is supplied to the oil chamber 26 from the oil reservoir chamber 34 of the oil suction feeder 32 to displace the spool 25 of the anti-reversal valve 21 to the open position, thereby effectively preventing reversing motions of the hydraulic motor 1 and quickly stopping the hydraulic motor 1 together with the upper rotary body or other inertial driven body.

Besides, it suffices to provide one reversing motion preventive valve assembly 20, which is constituted by the anti-reversal valve 21 which is two port two position spool valve and the oil suction feeder 32, between the main conduits 6A and 6B through the shuttle valve 39 or other pressure selector means. It follows that, for example, the reversing motion preventive valve assembly 20 can be easily built into the casing of the hydraulic motor 1 to avoid complication of the hydraulic drive circuit construction as a whole. The reversing motion preventive valve assembly 20 can be provided in a compact form and in a reduced size by fitting the spool 25 and piston 31 in the valve casing, contributing to simplify the construction of the hydraulic drive circuit as a whole.

In addition, the use of the spool 25 makes it possible for the anti-reversal valve 21 to have an insensitive zone of a predetermined stoke length and to connect the oil reservoir chamber 34 of the oil suction feeder 32 and the oil chamber 26 to the tank 3 through the tank conduit 27, branch conduit 35 and throttle 38, forming an independent closed hydraulic circuit separate from the hydraulic motor 1 and the main conduits 6A and 6B. The spool 25 of the anti-reversal valve 21 is arranged to be displaced by feeding the operating oil from the oil reservoir chamber 34 of the oil suction feeder 32 into and out of the oil chamber 26. Consequently, fluctuations in the driving pressure of the hydraulic motor 1 or in the braking pressure, if any, can be effectively absorbed by the oil reservoir chamber 34 of the oil suction feeder 32, securely preventing inadvertent opening of the anti-reversal valve 21 which might otherwise be caused by movements of the spool 25 under direct influence of such pressure fluctuations.

Figure 3:
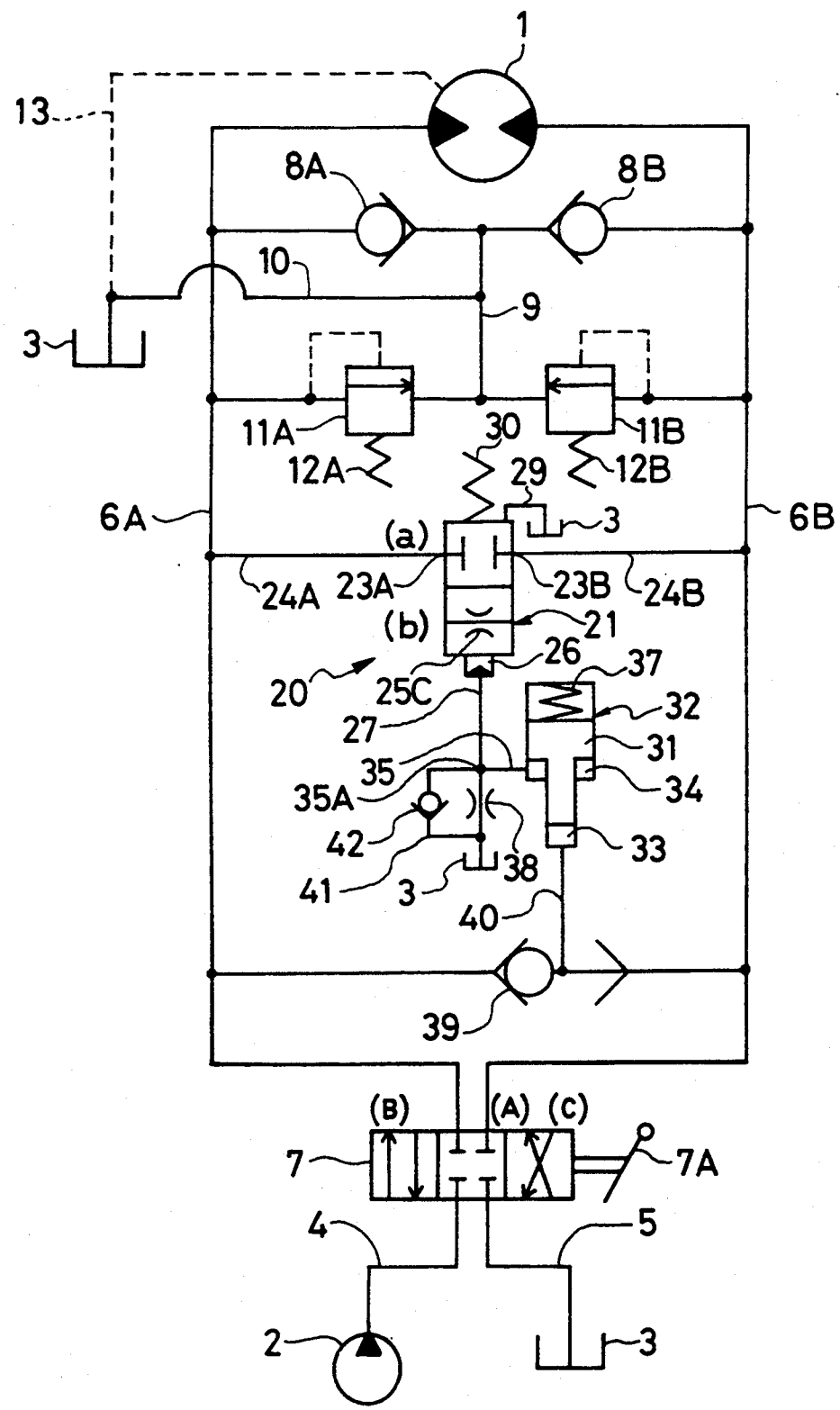
FIG. 3 is a diagrammatic illustration of a hydraulic rotational drive circuit in a second embodiment of the invention, including a valve for preventing reversing motions of an inertial body.
Figure 4:
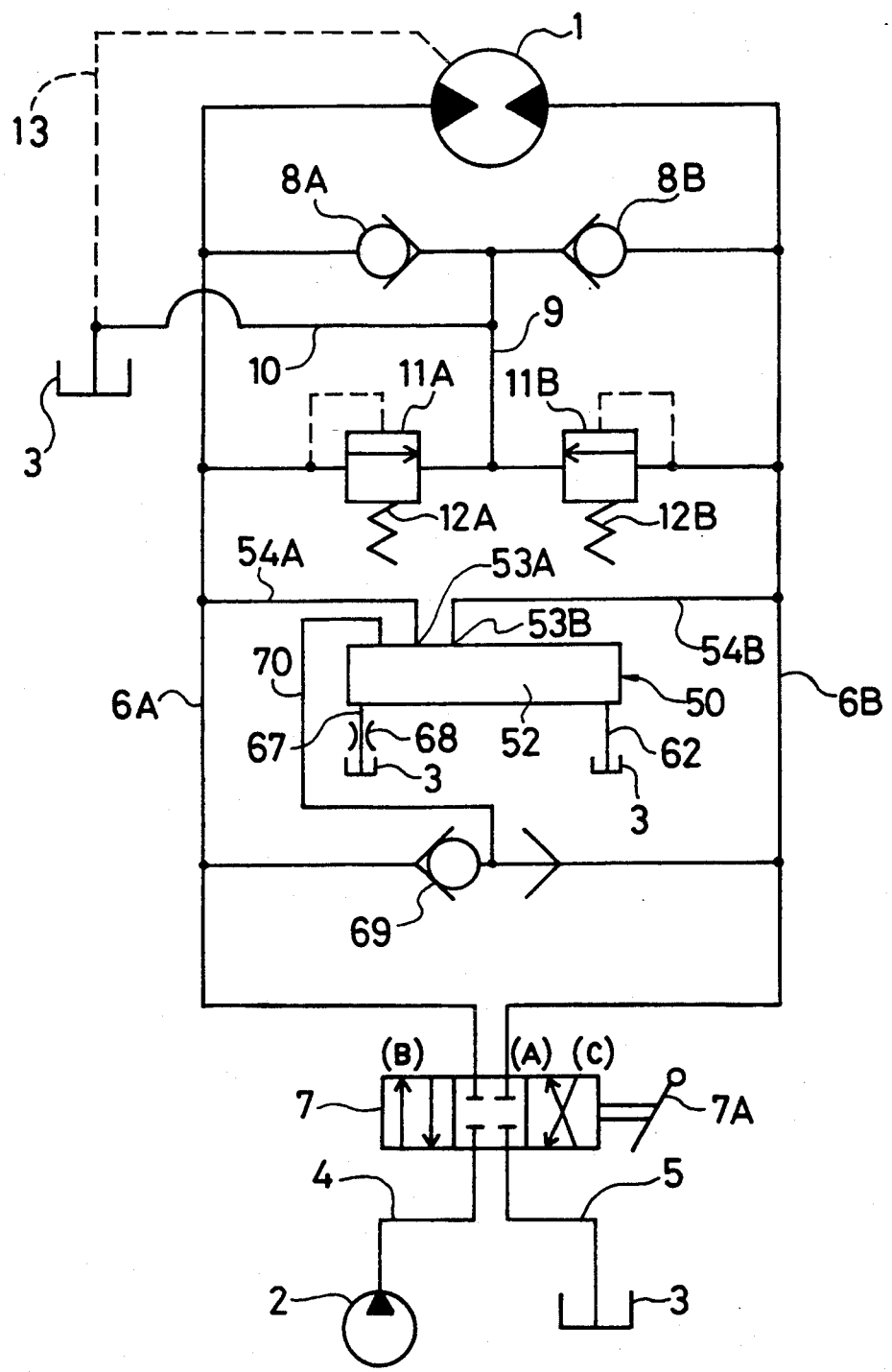
FIG. 4 is a diagrammatic illustration of a hydraulic rotational drive circuit in a third embodiment of the invention, including a valve for preventing reversing motions of an inertial body.

Referring now to FIG. 3, there is illustrated a second embodiment of the present invention, in which the component parts common with the foregoing first embodiment are designated by common reference numerals and their explanations are omitted to avoid repetitions. This embodiment has features in the provision of a bypass conduit 41 which connects the front and rear sides of the throttle 38 in the tank conduit 27, the bypass conduit 41 having a check valve 42 in parallel relation with the throttle 38.

The check valve 42 is provided in such a manner as to permit oil flows from the tank 3 to the oil chamber 26 and the oil reservoir chamber 34. Therefore, for example, when a pilot pressure in excess of the preset pressure level of the set spring 37 is introduced into the pilot chamber 33 of the oil suction feeder 32 to expand the volume of the oil reservoir chamber 34, the check valve 42 permits the oil reservoir chamber 34 to suck oil smoothly from the oil tank 3, preventing development of negative pressures in the oil reservoir chamber 34. Accordingly, as the volume of the oil reservoir chamber 34 is on an increase, the oil in the oil chamber 26 is sucked into the oil reservoir chamber 34, also preventing the oil chamber 26 from turning into a negative pressure condition.

Then, once the inertial rotation of the hydraulic motor 1 is stopped, the pilot pressure prevailing in the pilot chamber 33 of the oil suction feeder 32 drops to a level below the preset pressure of the set spring 37. Whereupon, the piston 31 is pushed by the set spring 37 to pressurize the oil in the oil reservoir chamber 34 while sending out the pressurized oil to the oil chamber 26 and the tank 3 through the branch conduit 35. However, at this time the check valve 42 is closed to block the oil flows therethrough, and the oil flow toward the tank 3 is restricted by the throttle 38 to ensure oil supply from the oil reservoir chamber 34 to the oil chamber 26.

When the oil in the oil chamber 26 subsequently flows out toward the tank 3, the check valve 42 is continuedly held in closed state, so that the discharge oil flow from the oil chamber 26 to the tank 3 is allowed only through the throttle 38, making it possible to slow down the speed of returning the anti-reversal valve 21 from the open position (b) to the closed position (a) by the throttle 38.

Thus, the present embodiment of the above-described construction can produce substantially the same operational effects as the foregoing first embodiment. Especially in the case of this second embodiment, the check valve 42 which is provided parallel with the throttle 38 effectively prevents cavitation or development of negative pressures in the oil chamber 26 and oil reservoir chamber 34 to ensure accurate operation of the anti-reversal valve 21 in preventing reversing motions of the hydraulic motor 1.

In the foregoing first and second embodiments, the throttle passage 25C is formed in the spool 25 between the annular grooves 25A and 25B in the fashion of H-shape. However, in place of this arrangement, the throttle passage 25C may be formed between the annular grooves 25A and 25B as a passage of U-shape. If desired, a throttle passage of any other form may be employed. Further, the annular grooves 25A and 25B may be substituted by an axial oil groove which is formed on the circumference of the spool 25 to constitute a throttle passage for establishing and blocking communication between the annular grooves 22B and 22C on the valve casing 22.

Further, the oil chamber 26 and the oil reservoir chamber 34 of the oil suction feeder 32, which are communicated with each other through the tank conduit 27 and branch conduit 35 in the foregoing first and second embodiments, may be arranged to communicate with each other directly without routing through the tank conduit 27 or other passages. In such a case, for example, the branch conduit 35 can be omitted.

Referring to FIGS. 4 through 8, there is illustrated a third embodiment of the invention, having features in a spool of a hollow cylindrical shape which is fitted in the spool sliding bore of the casing, the spool internally defining a piston sliding bore to receive a piston of the pressurized oil supply means so that the valve means of the pressurized oil supply means can be built into the casing in a compact form.

In these figures, the reference 50 denotes an inertial body reversing motion preventive valve employed in this embodiment, which is constituted by an anti-reversal valve 51 and an oil suction feeder means, serving as the valve means and the pressurized oil supply means, respectively, as will be described hereinlater.

Figure 5:
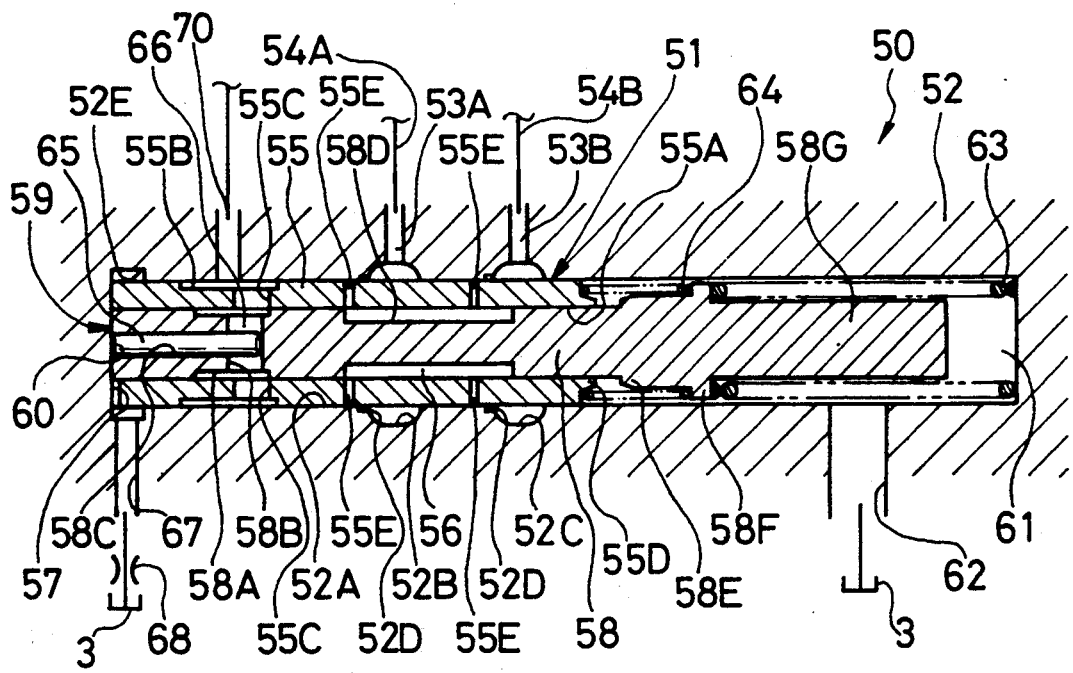
FIG. 5 is a diagrammatic longitudinal section of the reversing motion preventive valve in FIG. 4, showing the piston of the valve as returned to its initial position.

The anti-reversal valve 51, serving as the valve means, is located between the main conduits 6A and 6B of the hydraulic motor 1. The anti-reversal valve 51 is built into a valve casing 52 which internally defines an axially extending spool sliding bore 52A, as shown in FIG. 5, along with annular oil grooves 52B and 52C which are formed radially outward of the spool sliding bore 52A and in positions spaced from each other by a predetermined distance in the axial direction of the spool sliding bore 52A. The oil grooves 52B and 52C are provided with notched portions 52D. The oil grooves 52B and 52C are constantly held in communication with a pair of ports 53A and 53B for influent and effluent pressure oil flows. The valve casing 52 is further provided with an annular groove 52E at the left end of the spool sliding bore 52A, the annular groove 52E forming part of an oil chamber 57 which will be described later. Formed between the annular groove 52E and the oil groove 52B is a pilot conduit 70 in communication with the spool sliding bore 70 to supply a pilot pressure to a pusher 65 which will be described later.

In this instance, the valve casing 52 is integrally formed within the casing (not shown) of the hydraulic motor 1, in a compact form together with charging check valves 8A and 8B and overload relief valves 11A and 11B, and in the course of the hydraulic rotational drive circuit. The ports 53A and 53B of the valve casing 52 are connected between the main conduits 6A and 6B through bypass conduits 54A and 54B.

Indicated at 55 is a hollow or tubular spool which is fitted in the spool sliding bore 52A, the spool 55 constituting an anti-reversal valve 51 together with an oil chamber 57 and a valve spring 64, which will be described later, to establish and block communication between the ports 53A and 53B (between the main conduits 6A and 6B) through a throttle passage 56 which will be described later. The spool 55 is in the form of a hollow cylinder with outside dimensions corresponding to the diameter of the spool sliding bore 52A, the spool 55 internally defining a piston sliding bore 55A. The spool 55 is formed with an annular groove 55B in its left portion at a position spaced from the annular groove 52E on the valve casing 52 and in constant communication with a pilot conduit 70, and a couple of radial oil holes 55C in communication with the groove 55B. On the other hand, the spool 55 is formed with a spring holder 55D in the form of an annular stepped wall in its right end portion.

Further, the spool 55 is provided with, for example, two pairs of throttle holes 55E which are bored radially into the spool 55 between the groove 55B and the spring stopper 55D, at positions spaced from each other by a predetermined distance in the axial direction correspondingly to the notched portions 52D. These throttle holes 55E forms a throttle passage 56 together with an oil groove 58D, which will be described later, for communicating the ports 53A and 53B with each other when the spool is in the open position shown in FIG. 7.

The reference 57 denotes an annular oil chamber which is formed between the left end face of the spool 55 and the valve casing 52, the oil chamber 57 receiving a supply of pressurized oil from an oil reservoir chamber 60 of an oil suction feeder 59, which will be described later. The received oil pressure is applied to the end face of the spool 55 to urge its sliding displacement from the closed position of FIG. 6 to the open position of FIG. 7 against the action of a valve spring 64.

Thus, the anti-reversal valve 51 which functions as the valve means is constituted by: the spool sliding bore 52A provided in the valve casing 52; a pair of ports 53A and 53B formed in the valve casing 52 in spaced positions in the axial direction of the spool sliding bore 52A and in communication with the first and second main conduits 6A and 6B; the spool 55 in the form of a hollow cylinder fitted in the spool sliding bore 52A and internally defining a piston sliding bore 55A; the throttle passage 56 for bringing the ports 53A and 53B into and out of communication with each other in relation with sliding displacements of the spool 55; the oil chamber 57 formed between one end of the spool 55 and the valve casing 52; and the valve spring 64 serving as a biasing means for urging the spool 57 toward the oil chamber 57.

Designated at 58 is a piston which is slidably fitted in the piston sliding bore 55A, the piston 58 constituting the oil suction feeder 59 which serves as the pressurized oil supply means, together with the oil reservoir chamber 60 and the set spring 63 which will be described later.

In this case, the piston 58 is formed into the shaped of an elongated stepped rod which is longer than the spool 55, and disposed in the valve casing 52 for displacements relative to the spool 55. Further, the piston 58 is provided with, in its left portions, an annular groove 58A which is constantly in communication with the oil holes 55C of the spool 55, a radial oil hole 58B which is in constant communication with the groove 58A, and an axial pusher sliding bore 58C which is bored from the oil hole 58B toward the left end face to support slidably therein a pusher 65 which will be described later. The piston 58 is further provided with an axially extending annular oil groove 58D in a position spaced by a predetermined distance from the groove 58A on the left side thereof, the oil groove 58D constituting the throttle passage 56 together with the respective throttle holes 55E of the spool 55.

Figure 6:
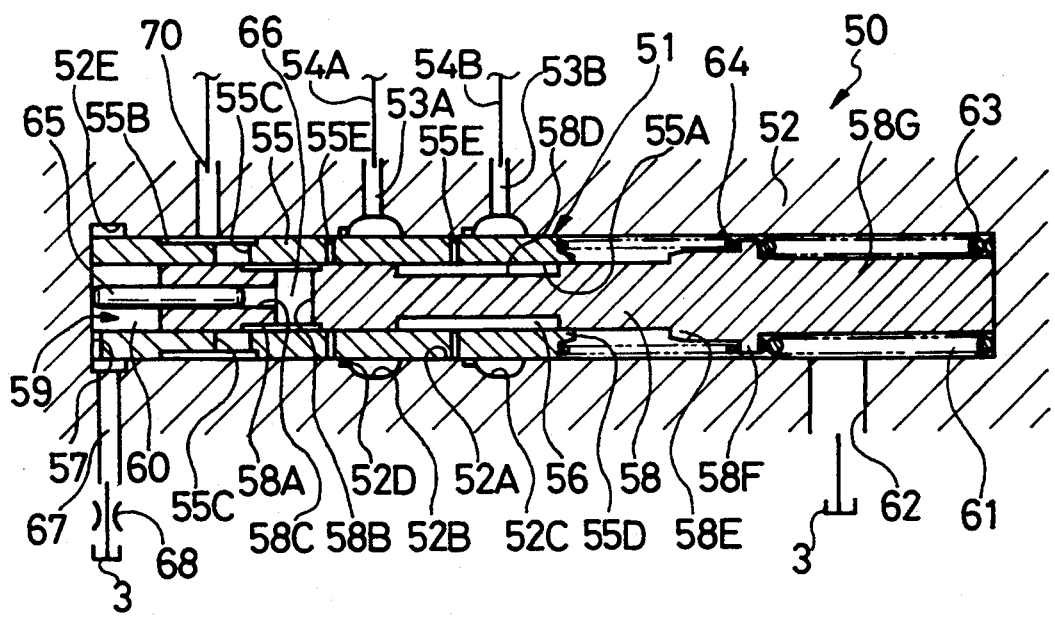
FIG. 6 is a longitudinal section similar to FIG. 5, but showing the piston in a stroke end position.

On the other hand, in a right portion which is projected from the piston sliding bore 55A into the valve casing 52, the piston 58 is formed with an annular stepped portion 58E at a position which is located in axially opposing relation with the spring holder 55D of the spool 55. When the spool 55 is slidingly displaced to the open position of FIG. 7, the annular stepped portion 58E is abutted against the fore end of the spring holder 55D on the spool 55 to delimit the stroke end position of the spool 55. Further, the piston 58 is formed with a spring holder 58F which is projected radially outward from a right portion of the annular stepped portion 58E for engagement with one end of a set spring 63. Further, in a right portion, the piston 58 is provided with a rod-like stopper portion 58G which is axially extended into a spring chamber 61, described later, and which is abuttingly engageable with the end face of the spring chamber 61 as shown in FIG. 6 to delimit the stroke end position of the piston 58.

Figure 7:
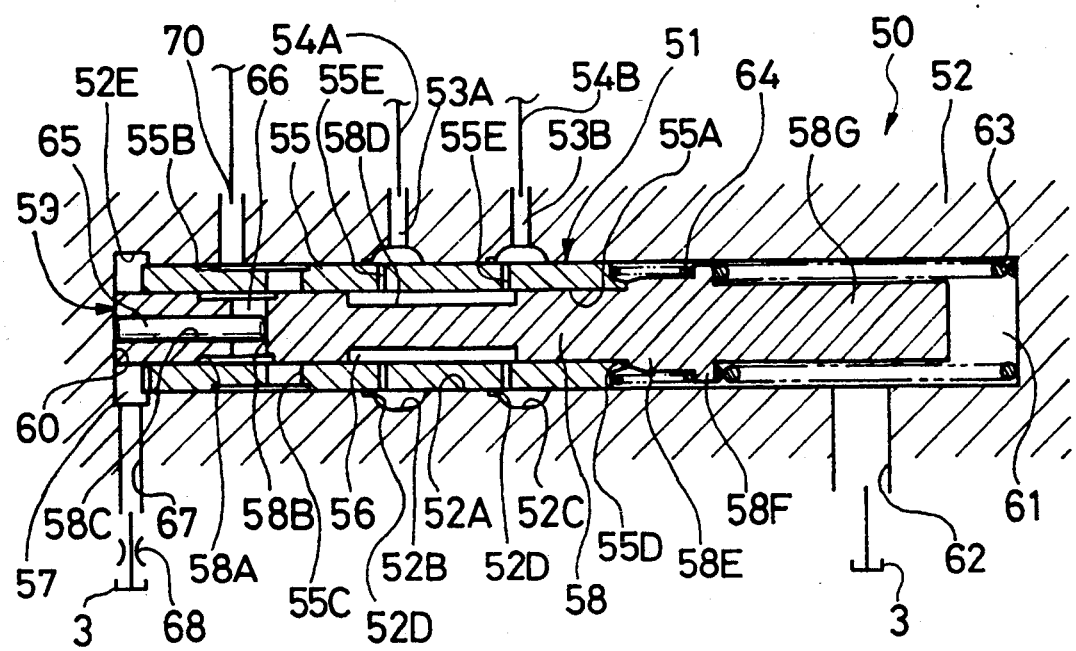
FIG. 7 is a longitudinal section similar to FIG. 5, but showing the spool of the valve which has been shifted to its open position by a sliding displacement.

Denoted at 60 is the oil reservoir chamber of variable volume which is formed radially inward of the oil chamber 57 between the left end face of the piston 58 and the valve casing 52, the oil reservoir chamber 60 being in communication with the oil chamber 57 in a radial direction and connected to the tank 3 through a tank conduit 67 which will be described later. As shown in FIG. 6, the volume of the oil reservoir chamber 60 is increased as the piston 58 is put in a sliding displacement toward its stroke end position, sucking and storing the oil into the oil reservoir chamber 60 from the tank 3 through the oil chamber 57. On the other hand, when the piston 58 is put in a sliding displacement toward the oil reservoir chamber 60 as shown in FIG. 7, the volume of the oil reservoir chamber 60 is diminished to send out the reserved oil to the oil chamber 57 under pressurization by the piston 58.

Indicated at 61 is a spring chamber which is formed in the valve casing 52 at a position on the right side of the piston 58, the spring chamber 61 being connected to the tank 3 through a conduit 62 and filled with the operating oil from the tank 3.

The reference 63 denotes a set spring or a pressure setting spring which is fitted around the stopper portion 58G within the spring chamber 61, the set spring 63 having its fore end abutted against the spring holder 58F of the piston 58 to bias the latter constantly toward the oil chamber 57 for returning same to the initial position shown in FIG. 5. The set spring 63 is adjusted to have a spring force corresponding to 75%–85% of the first preset control pressure level PC at which the overload relief valves 11A and 11B are opened, permitting the pusher 65 to urge the piston 58 to the stroke end position shown in FIG. 6 when the pilot pressure from the pilot conduit 70 exceeds the second preset control level (hereinafter referred to as "preset level") which is set, for example, at 0.85×PC.

Indicated at 64 is a valve spring which is interposed as a biasing means between the spring holder 55D on the spool 55 and the spring holder 58F on the piston 58, the valve spring 64 being adjusted to have a spring force weaker than the set spring 63 and constantly biasing the spool 55 toward the oil chamber 57. The valve spring 64 permits displacements of the spool 55 relative to the piston 58 within the spool sliding bore 52A of the valve casing 52. When the spool 55 is slidingly displaced toward the spring chamber 61 to assume its open position as shown in FIG. 7, the ports 53A and 53B of the valve casing 52 are communicated with each other through the throttle passage 56.

Denoted at 65 is a pusher of small diameter which is fitted in the pusher sliding bore 58C of the piston 58 and which defines a pilot chamber 66 between the oil hole 58B of the piston 58 and the pusher sliding bore 58C. The pilot chamber 66 is supplied with pressure oil as a pilot pressure from a shuttle valve 69 which selects the pressure in the main conduit 6A or 6B whichever is at a higher level as will be described later.

In this case, as soon as the pilot pressure in the pilot chamber 66 exceeds the preset pressure of the set spring 63, the pusher 65 is pushed and protruded toward the oil reservoir chamber 60 by the pilot pressure to put the piston 58 in a sliding displacement as far as the stroke end position shown in FIG. 6 against the action of the set spring 63. As a result, the volume of the oil reservoir chamber 60 is increased according to the extent of the piston stroke as shown in FIG. 6, thereby sucking the operating oil into the oil reservoir chamber 60 from the tank 3 through the tank conduit 67 and oil chamber 57.

Accordingly, the oil suction feeder 59 which serves as the pressurized oil supply means is constituted by: the piston 58 which is slidably fitted in the piston sliding bore 55A in the spool 55; the oil reservoir chamber 60 which is defined by the piston 58 at one end of the piston sliding bore 55A in constant communication with the oil chamber 57; the set spring 63 which is fitted between the other end of the piston 58 and the valve casing 52 to bias the piston 58 constantly toward the oil chamber 60 with a spring force corresponding to a second predetermined control pressure level; the pilot chamber 66 forming the pilot pressure section in association with one end of the piston 58 and adapted to put the piston 58 in a sliding displacement against the set spring 63 to draw in oil into the oil reservoir chamber 60 when the pressure in the first or the second main conduit 6A and 6B, whichever is at a higher pressure level, exceeds the afore-mentioned predetermined control pressure level.

Indicated at 67 is a tank conduit serving as an oil passage which connects the oil chamber 57 with the tank 3, and at 68 is a throttle serving as the flow resistant means provided within the length of the tank conduit 67. The throttle 68 produces throttling effects on the flow of oil (operating oil) to be discharged from the oil reservoir chamber 60 to the tank 3 through the oil chamber 57, when the piston 58 is pushed back by the set spring 63 from the stroke end position of FIG. 6 toward the oil reservoir chamber 60 as shown in FIG. 7. As a consequence, pressurized oil is supplied to the oil chamber 57 from the oil reservoir chamber 60, and the spool 55 is put in a sliding displacement toward the spring chamber 61 against the action of the valve spring 64 by the pressurized oil prevailing in the oil chamber 57.

Further, while the piston 58 is in a sliding displacement from its initial position toward its stroke end position, the tank conduit 67 supplies the operating oil to let the oil reservoir chamber 60 suck in the oil from the tank 3. At this time, the throttle 68 causes the oil reservoir chamber 60 tends to develop a negative pressure condition. However, during the oil supply, the throttle 68 imposes substantially no influences on the operations of the spool 55 and piston 58, so that the tendency of the oil reservoir chamber 60 toward a negative pressure condition is instantly canceled.

As a result, when the piston 58 is pushed toward the spring chamber 61 by the pusher 65, oil (operating oil) is smoothly sucked (replenished) into the oil reservoir chamber 60 from the tank 3, permitting the piston 58 to displace quickly from the initial position shown in FIG. 5 to the stroke end position shown in FIG. 6. However, conversely when the piston 58 is pushed back to the initial position by the set spring 63, increasing the oil pressure in the oil reservoir chamber 60 and oil chamber 57 to push the spool 55 back toward the spring chamber 61 as shown in FIG. 7, and then the spool 55 is pushed back toward the oil chamber 57 by the valve spring 64, the throttle 68 functions to constrict the discharge oil flows from the oil chamber 57. Accordingly, the throttle 68 functions to slow down the sliding speed (the return speed) of the spool 55, letting the spool 55 retain the open position shown in FIGS. 7 and 8 over a relatively long time period.

The reference 69 denotes the shuttle valve which is interposed between the main conduits 6A and 6B at a position between the hydraulic motor 1 and the directional switch valve 7. The shuttle valve 69 functions as a high pressure selector valve to connect either the main conduit 6A or 6B, which is at a higher pressure level, to the pilot conduit 70 for supplying the higher oil pressure to the pilot chamber 66 as a pilot pressure through the pilot conduit 70, the grooves 55B and 55C on the spool 55 and the grooves 58A and 58B on the piston 58.

The reversing motion preventive valve 50 of this embodiment, with the above-described construction, operates in the following manner in suppressing reversing actions of an inertial body.

Firstly, when the directional switch valve 7 is switched from the neutral position (A), for example, to the drive position (B) to rotate the upper rotary body by the hydraulic motor 1, the high oil pressure flowing through the main conduit 6A is supplied as a high pilot pressure from the shuttle valve 69 to the pilot chamber 66 in the piston 58 through the pilot conduit 70. By this pilot pressure, the pusher 65 is pressed toward the oil reservoir chamber 60 and projected from the piston 58 to protrude into the oil reservoir chamber 60. As a result, the pusher 65 changes the pressure receiving area in the pilot chamber 66 in such a way as to cause the piston 58 to displace from its initial position of FIG. 5 to the stroke end position shown in FIG. 6 against the action of the set spring 63.

At this time, the oil reservoir chamber 60 is increased in volume according to the extent of the piston stroke of the piston 58 as shown in FIG. 6 and filled with the operating oil which is replenished from the tank 3 through the tank conduit 67. Further, at this time the oil chamber 57 and the oil reservoir chamber 60 are negatively pressurized to a certain extent, so that the spool 55 is held in abutting engagement with the end face of the valve casing 52 on the side of the oil chamber 57, without displacing toward the spring chamber 61 under the influence of the valve spring 64.

Nextly, when the directional switch valve 7 is returned from the drive position (B) to the neutral position (A) during rotation of the upper rotary body, the hydraulic motor 1 is put in inertial rotation by the upper rotary body, that is, by the inertial body, producing a braking pressure in the main conduit 6B. In case the overload relief valve 11B is opened by this braking pressure, the pressure in the main conduit 6B has risen to or above the level of the first control pressure level PC at which the overload relief valve 11B is opened. The produced high oil pressure is supplied as a pilot pressure from the shuttle valve 66 to the pilot chamber 66 in the piston 58 through the pilot conduit 70. Therefore, the pusher 65 continues to protrude into the oil reservoir chamber 60, putting the piston 58 in a sliding displacement as far as the stroke end position of FIG. 6 while filling the enlarged oil reservoir chamber 60 with the oil. In this state, the operating oil is sucked into the oil reservoir chamber 60 from the oil chamber 57, holding the spool 55 in abutting engagement with the end face of the valve casing 57 on the side of the oil chamber 57.

In this instance, the pilot pressure in the pilot chamber 66 could drop momentarily, for example, for an instant when the pressure selected by the shuttle valve 69 is switched from the driving pressure in the main conduit 6A to the braking pressure in the main conduit 6B. Such a momentary drop of the pilot pressure might cause the piston 58 to move toward the oil reservoir chamber 60 (to the left) from the position of FIG. 6, supplying a small amount of oil from the oil reservoir chamber 60 to the oil chamber 57 and moving the spool 55 to the right against the action of the valve spring 64. However, there is no possibility of the main conduits 6A and 6B being inadvertently brought into communication with each other even under such circumstances because a relative large insensitive zone is provided between the throttle hole 55E of the spool 55 and the oil groove 58D of the piston 58 in the state of FIG. 6.

Then, after being opened to apply brakes to the inertial rotation of the hydraulic motor 1, the overload relief valve 11B is then closed and the hydraulic motor 1 once comes to a stop. However, at this time the pressure in the main conduit 6B leaks from inside of the hydraulic motor 1, and the leak oil is discharged to the tank 3 through the drain conduit 13, so that the pressure in the main conduit 6B drops to a level lower than the control level PC of the overload relief valve 11B, for example, to a level corresponding to 75%–85% of the pressure PC of the overload relief valve 11B.

Consequently, a similar pressure drop occurs to the pilot pressure which is supplied to the pilot chamber 66 from the shuttle valve 69 through the pilot conduit 70. Therefore, the pusher 65 permits the piston 58 to be pushed toward the oil reservoir chamber 60 by the set spring 63 from the stroke end position of FIG. 6. Then, as the piston 58 is pushed toward the oil reservoir chamber 60 from the stroke end position, the oil reservoir chamber 60 is diminished in volume, so that the oil in the oil reservoir chamber 60 begins to be discharged to the tank 3 through the oil chamber 57 and the tank conduit 67.

However, the throttle 68, which has throttling effects on the oil flows to be discharged to the tank 3 from the oil reservoir chamber 60 through the oil chamber 57 and the tank conduit 67, restricts the discharge oil flow rate from the oil chamber 57 to the tank 3. Therefore, the oil chamber 57 is supplied with oil in pressurized state, and the spool 55 is pushed toward the spring chamber 61 by the oil pressure prevailing in the oil chamber 57. Then, the spool 55 assumes the open position shown in FIG. 6, communicating the ports 53A and 53B (or the bypass conduits 54A and 54B) with each other through the throttle passage 56 including the throttle holes 55E and the oil groove 58D in the piston 58. At this time, the stroke end of the piston 58 is limited to the position where the fore end of the spring holder 55D of the spool 55 comes into abutting engagement with the annular stepped portion 58E of the piston 58.

Then, as the piston 58 is returned to the initial position shown in FIG. 7, the oil in the oil chamber 57 is discharged to the tank 3 through the tank conduit 67 and the throttle in proportion to the extent of movement of the spool 55 toward the oil chamber 57 under the influence of the valve spring 64. Thus, thanks to the throttling effects of the throttle 68, the return speed of the spool 55 can be made slower as it is displaced toward the oil chamber 57 from the open position shown in FIG. 7, permitting to prolong the open period in which the communication between the ports 53A and 53B (or between the bypass conduits 54A and 54B) is maintained through the throttle passage 56 including the throttle holes 55E in the spool 55 and the oil groove 58D on the piston 58. As shown in FIG. 5, the spool 55 gets the closed position at a time point when the throttle holes 55E pass the positions of the notched portions 52D which are formed contiguously to the oil grooves 52B and 52C of the valve casing 52. That is to say, the spool 55 permits communication between the bypass conduits 54A and 54B while it is in the range between the open position shown in FIG. 7 and the position shown in FIG. 5.

Thus, according to the present embodiment, when inertial rotation of the hydraulic motor 1 is once stopped, the piston 58 of the reversing action preventive valve 50 is returned to the initial position from its stroke end position to slide the spool 55 to the open position. Thereafter, while being returned to the closed position by the action of the valve spring 64, the spool 55 is retained in the open state over a relatively long time period. Accordingly, the high pressure in the main conduit 6B, for example, is allowed to flee into the other main conduit 6A through the bypass conduits 54A and 54B in a secure manner, under the throttling effects of the throttle passage 56 of the anti-reversal valve 51. This makes it possible to suppress the pressure differential ΔP (see FIG. 12), which occurs between the main conduits 6A and 6B as discussed hereinbefore in connection with the prior art, for preventing repeated reversing motions of the hydraulic motor 1 effectively.

Figure 8:
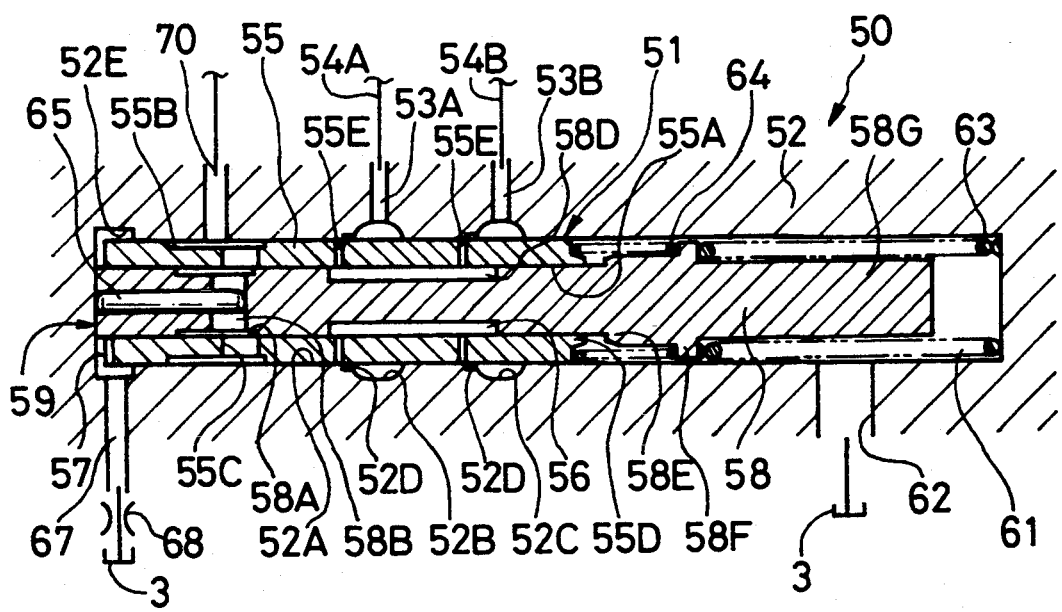
FIG. 8 is a longitudinal section similar to FIG. 5, but showing the spool of the valve which has been pushed back toward the oil chamber from the open position.

Then, the spool 55 is gradually pushed toward the oil chamber 57 by the action of the valve spring 64, and, as soon as its sliding displacement reaches the position of FIG. 8, it blocks the communication between the ports 53A and 53B and thus blocks the communication between the main conduits 6A and 6B through the bypass conduits 54A and 54B to retain the hydraulic motor 1 at rest.

Further, in case the oil leak from the hydraulic motor 1 is small in amount at the time of stopping the inertial rotation of the hydraulic motor 1, a reversing action of the hydraulic motor 1 may take place due to a pressure differential ΔP between the main conduits 6A and 6B. In such a case, however, the reversing action of the hydraulic motor 1 is of a very slight degree. On such an occasion, for example, the pressure in the main conduit 6B drops to the preset control level of the set spring 63, and the main conduits 6A and 6B are communicated with each other by the throttle passage 56 of the spool 55 and piston 58, instantly preventing further reversing motions of the hydraulic motor 1.

Accordingly, this embodiment can produce substantially the same effects as the foregoing first embodiment in effectively preventing the hydraulic motor 1 from starting a reverse rotation and quickly stopping the hydraulic motor 1 with the upper inertial rotary body.

Especially in case of the present embodiment, the reversing motion preventive valve 50 is constituted by the spool 55 and the piston 58 of the oil suction feeder 59, which are relatively displaceably provided within the casing 52 of the anti-reversal valve 51, so that it suffice to provide one and single reversing motion preventive valve 50 between the main conduits 6A and 6B through the shuttle valve 69. As a consequence, for example, the reversing action preventive valve 50 can be built into the casing of the hydraulic motor 1 in a simplified fashion, and, in addition to simplification of construction as a whole, the reversing action preventive valve 50 including the spool 55 and piston 58 can be arranged in a compact form with substantial downsizing.

Further, when the spool 55 is in the closed position shown in FIG. 5, the respective throttle holes 55E are shielded relative to the notched portions 52D of the valve casing 52, and, when in the closed position shown in FIG. 6, one of the throttle holes 55E is blocked by the piston 58 against communication with the oil groove 58D on the piston 58. Until the open position of FIG. 7 is reached by relative displacements of the spool 55 and piston 58 within the valve casing 52, the communication between the ports 53A and 53B is securely blocked despite sliding displacements of either one of the spool 55 and piston 58. Besides, the combination of the spool 55 and the piston 58 permits to provide an insensitive zone of a relatively large stroke length.

Fluctuations in the driving pressure of the hydraulic motor 1 or in the braking pressure might cause the piston 58 to move toward the oil reservoir chamber 60 (to the left) from the position of FIG. 6, sending out a small amount of oil from the oil reservoir chamber 60 to the oil chamber 57 and as a result moving the spool 55 to the right against the valve spring 64. In such a case, however, due to the existence of the insensitive zone which extends over a relatively large range between the throttle holes 55E of the spool 55 and the oil groove 58D of the piston 58 in the position of FIG. 6, there is no possibility of the main conduits 6A and 6B being inadvertently brought into communication with each other, precluding inadvertent opening of the reversing motion preventive valve 50 in an assured manner.

Further, the pusher sliding bore 58C in the piston 58 is formed to have a smaller diameter than the piston sliding bore 55A in the spool 55. Therefore, the pusher 65 can be arranged to have an extremely small pressure receiving area for the pilot pressure which is supplied to the pilot chamber 66 from the pilot conduit 70. It follows that the spring force of the set spring 63 can be minimized correspondingly to the pressure receiving area of the pusher 65. Namely, even reduced in size and weight, the set spring 63 can return the piston 58 securely to the initial position. In addition, the oil reservoir chamber 60 is arranged to have a large volume as compared with the pusher sliding bore 58, so that a relatively large quantity of oil can be stored in the oil reservoir chamber 60 when the piston 58 reaches the stroke end position. Accordingly, it becomes possible to prolong the open period of the spool 55 effectively as it is returned from the open position to the closed position by the valve spring 64 while the operating oil is supplied to the oil chamber 57 from the oil reservoir chamber 60.

Furthermore, the open period of the spool 55 can be adjusted arbitrarily by varying the dimensions of the spool 55, piston 58, pusher 65 and throttle 68 (or the spring forces of the set spring 63 and valve spring 64) according to the dimensions of the upper rotary body or of the inertial body. On the other hand, the spool 55 is formed with the throttle holes 55E at right angles with its sliding direction, so that it can suppress to a minimum the hydrodynamic actions of the operating oil flowing through the throttle passage 56, precluding the disturbances of the sliding movements of the spool 55 under the influences of such hydrodynamic actions.

Figure 9:
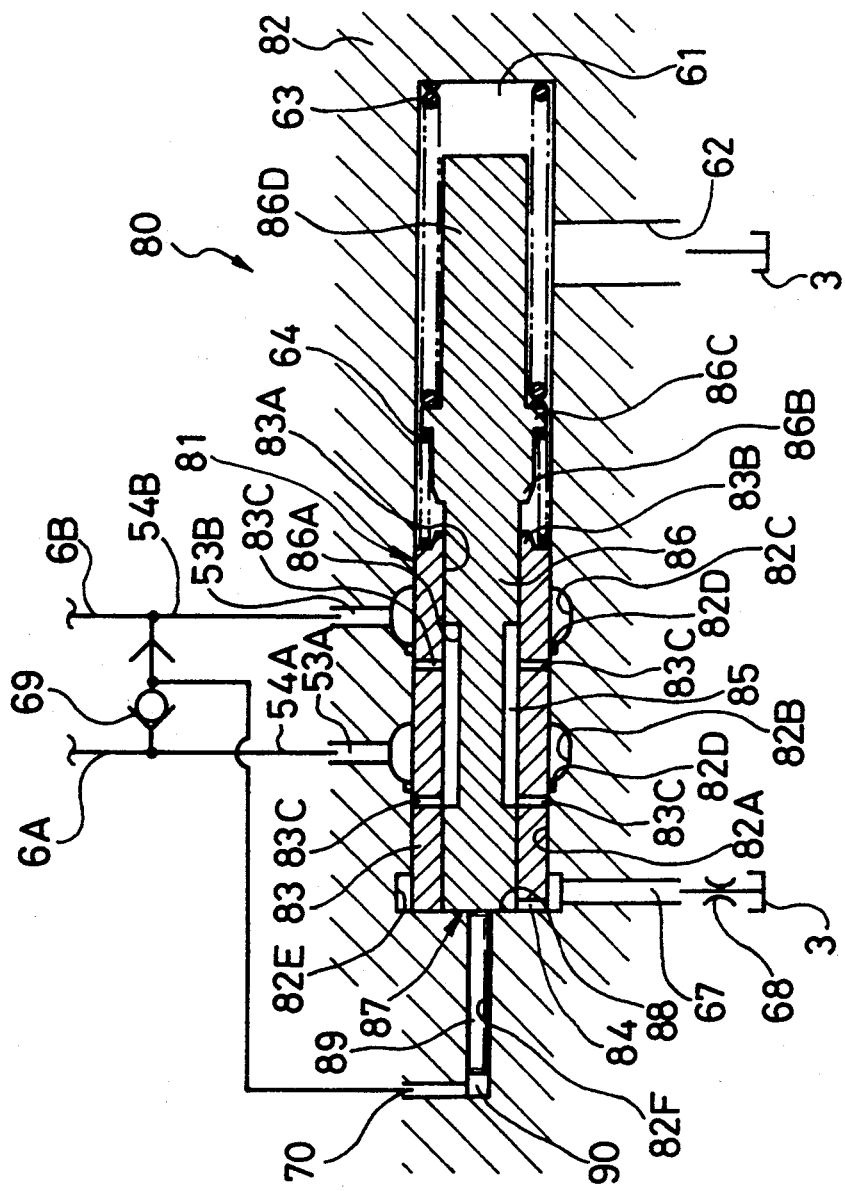
FIG. 9 is a longitudinal section of a reversing motion preventive valve in a fourth embodiment of the invention, showing the piston of the valve which has been returned to its initial position.

Referring now to FIG. 9, there is illustrated a fourth embodiment of the present invention. Features of this embodiment reside in an arrangement including: a pusher sliding bore formed at one end of the valve casing in communication with the spool sliding bore; and a pusher slidably fitted in the pusher sliding bore, the pusher defining a pilot chamber at one end of the pusher sliding bore to receive a supply of pilot pressure from outside and being abutted at the other end against one end face of the piston for pushing same. In the following description of this embodiment, the component parts common with the foregoing third embodiment are designated by common reference numerals and their explanations are omitted to avoid repetitions.

In FIG. 9, indicated at 80 is an inertial body reversing motion preventive valve which is constituted by an anti-reversal valve 81 and an oil suction feeder 87 serving as the pressurized oil supply means, as will be described later.

The reference 81 denotes the above-mentioned anti-reversal valve, and the reference 82 denotes a valve casing for the anti-reversal valve 81. Similarly to the valve casing 52 in the foregoing third embodiment, the valve casing 82 is provided with a spool sliding bore 82A, annular oil grooves 82B and 82C, notched portions 82D and annular groove 82E. In this case, however, the valve casing 82 is provided with a pusher sliding bore 82F of a small diameter at one end of and in communication with the spool sliding bore 82A. The oil grooves 82B and 82C of the valve casing 82 constitute part of the ports 53A and 53B, and are communicated with the main conduits 6A and 6B through bypass conduits 54A and 54B.

Denoted at 83 is a spool in the form of a hollow cylinder which is fitted in the spool sliding bore 82A and which is shaped in the same manner as the spool 55 of the foregoing third embodiment except for the annular groove 55B and oil holes 55C. The spool 83 is provided with a piston sliding bore 83A and a spring holder 83B. A valve spring 64 is interposed between the spring holder 83B on the spool 83 and a spring holder 86C on a piston 83, which will be described later, thereby biasing the spool 55 constantly toward an oil chamber 84.

In this instance, the spool 83 constitutes the valve means together with the valve spring 64 and oil chamber 84. Similarly to the oil chamber 57 of the above-described third embodiment, the oil chamber 84 is connected to the tank 3 through tank conduit 67 and throttle 68. Further, as oil holes, the spool 83 is bored with radial throttle holes 83C at predetermined axially spaced positions correspondingly to the notched portions 82D. Together with an oil groove 86A which will be described later, the throttle holes 83C constitutes a throttle passage 85 which communicates the ports 53A and 53B of the valve casing 82 with each other.

Indicated at 86 is a piston which is fitted in the piston sliding bore 83A in the spool 83 and which constitutes an oil suction feeder 87 or the pressurized oil supply means along with the set spring 63 and an oil reservoir chamber 88 which will be described later. The piston 86 is formed in the same shape as the piston 58 of the above-described third embodiment except for the annular groove 58A, the oil hole 58B and the pusher sliding bore 58C. Namely, in this particular case, the piston 86 is formed with an axially extending annular oil groove 86A at a position spaced to the right by a predetermined distance from its left end face to constitute the throttle passage 85 together with the throttle holes 83C on the part of the spool 83.

Further, the piston 86 is provided with an annular stepped portion 86B in its right portion, the annular stepped portion 86B being projected out of the piston sliding bore 83A of the spool 83 into the valve casing 82 as far as a position axially in alignment with the spring holder 83B on the spool 83. When the spool 83 is put in a rightward sliding displacement in FIG. 9, the annular stepped portion 86B delimits the stroke end position of the spool 83 by abutting engagement with the fore end of the spring holder 83B on the spool 83. The piston 86 is further formed with a radially projecting spring holder 86C on the right side of the annular stepped portion 86B, and an axially extending rod-like stopper 86D which delimits the stroke end position of the piston 86. Interposed between the spring holder 86C of the piston 86 and the outer end of the spring chamber 61 is a set spring 63 which biases the piston 86 constantly toward an oil reservoir chamber 88.

The oil reservoir chamber 88 is formed radially inward of the oil chamber 84 and between the left end face of the piston 86 and the valve casing 82, and arranged substantially in the same manner as the oil reservoir chamber 60 of the above-described third embodiment. When the piston 86 is put in a rightward sliding displacement in FIG. 9, the oil reservoir chamber 88 is increased in volume to suck in oil from the tank 3 and store oil therein, and, when the piston 86 is put in a leftward sliding displacement, the stored oil in the oil reservoir chamber 88 is supplied to the oil chamber 84 in a pressurized state.

The reference 89 indicates a cylindrical pusher of a small diameter which is slidably fitted in the pusher sliding bore 82F of the casing 82. The pusher 89 defines a pilot chamber 90 between its left end face and the pusher sliding bore 82F to serve as a pilot section. The oil pressure which is supplied to the pilot chamber 90 through the pilot conduit 70 acts on the left end face of the pusher 89 as a pilot pressure. Therefore, when the pusher 89 is pushed rightward in FIG. 9 by a high pilot pressure, it is protruded from the pusher sliding bore 82F into the oil reservoir chamber 88 to put the piston 86 in a sliding displacement to the stroke end position against the action of the back-stroke spring 63.

Thus, in this embodiment with the above arrangements, the high pressure, which prevails in the pilot chamber 90 at the time of inertial rotation of the hydraulic motor 1, puts the piston 86 in a sliding displacement toward its stroke end position integrally with the pusher 89. On the other hand, on stopping the inertial rotation, the pressure in the pilot chamber 90 drops below the preset control level of the set spring 63, and therefore the piston 86 is returned to the initial position. At this time, the oil in the oil reservoir chamber 88 is supplied to the oil chamber 84 and gradually discharged to the tank 3 through the throttle 68. By this throttling effects of the throttle 68, the return speed of the spool 83 in its sliding displacement toward the oil chamber 84 from the open position can be slowed down to produce substantially the same effects as in the above-described third embodiment.

Figure 10:
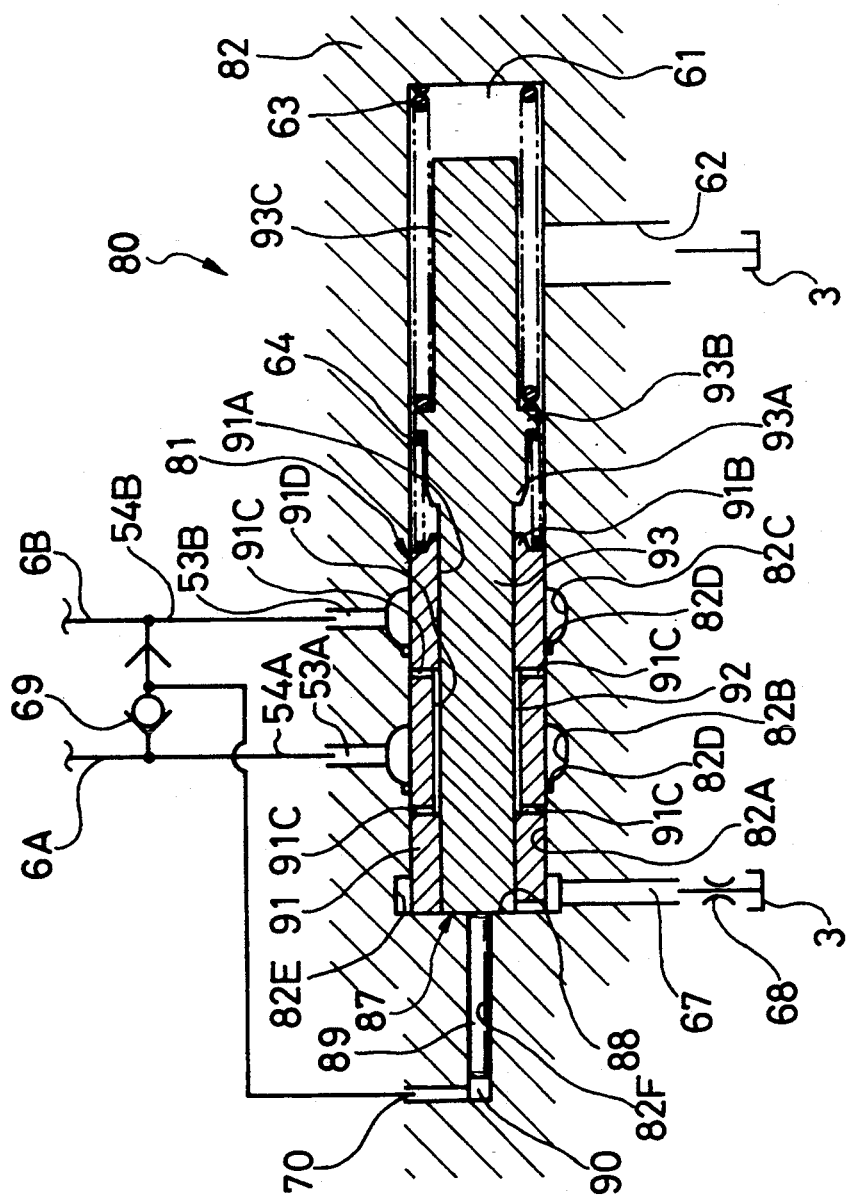
FIG. 10 is a longitudinal section of a reversing motion preventive valve in a fifth embodiment of the invention, showing the piston of the valve returned to its initial position.
Figure 11:
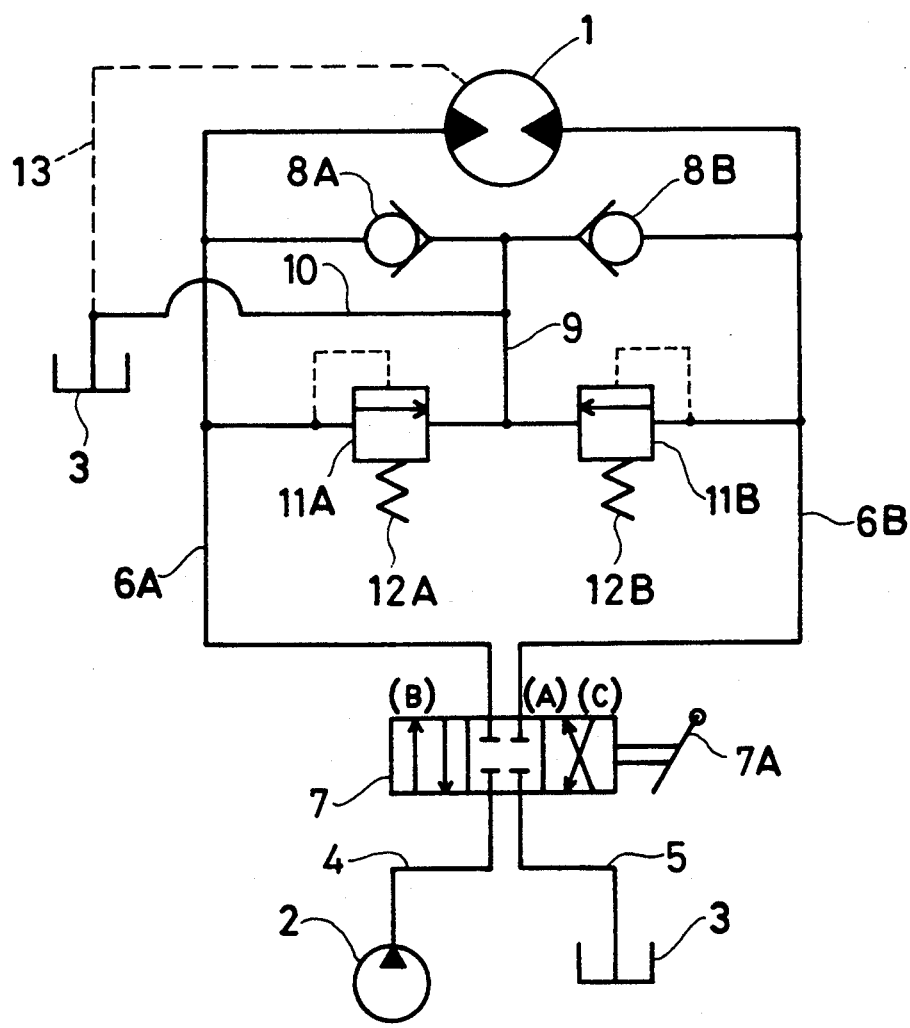
FIG. 11 is a diagrammatic illustration of a hydraulic rotational drive circuit by prior art.

Referring now to FIG. 10, there is illustrated a fifth embodiment of the invention. In the following description, the component parts common with the foregoing fourth embodiment are designated by common reference numerals or characters and their explanations are omitted to avoid repetitions. The features of this embodiment reside in an annular oil groove 91D which is formed integrally on the inner periphery of a spool 91 to communicate throttle holes 91C with each other, the oil groove 91D and the throttle holes 91C forming a throttle passage 92 which intercommunicates the ports 53A and 53B of the valve casing 82.

In this case, the spool 91 is arranged substantially in the same manner as the spool 83 of the foregoing fourth embodiment except for the oil groove 91D, and provided with a spring holder 91B along with the above-mentioned throttle holes 91C. Further, a piston 93, which is fitted in a piston sliding bore 91A in the spool 91, is arranged in the same manner as the piston 86 in the foregoing fourth embodiment except for the oil groove 86A. The piston 93 is provided with an annular stepped portion 93A, a spring holder portion 93B and a stopper 93C.

Similarly, this embodiment can produce substantially the same effects as the foregoing fourth embodiment of the invention. Particularly in this case, however, the piston 93 can be formed in a simple shape since there is no need for providing part of the throttle passage 92 on its circumferential surface.

In the above-described third embodiment, the throttle passage 56 is constituted by the throttle holes 55E, which are formed in the spool 55, and the oil groove 58D which is formed on the circumference of the piston 58. However, similarly to the spool 91 described in the foregoing fifth embodiment, the throttle passage may be constituted by an annular oil groove which is formed on the inner periphery of the spool 55 in such a manner as to intercommunicate the throttle holes 55E.

Further, although the spool 55 is described as being formed with the throttle holes 55E in the third embodiment, the present invention is not limited to this arrangement. For example, the throttle passage which intercommunicates the oil grooves 52B and 52C in the open position shown in FIG. 7 may be formed in a bent shape within the spool 55, for instance, may be formed in U-shape if desired. The same applies to the spool 83 (91) in the above-described fourth and fifth embodiments of the invention.

Moreover, in the foregoing third, fourth and fifth embodiments, the throttle 68 is provided as a flow resistant means within the length of the tank conduit 67 which conveys oil flows to the tank. However, in these embodiments, a check valve similar to the check valve 42 of the second embodiment may be inserted in the tank conduit 67 in parallel relation with the throttle 68, if desired.

On the other hand, in the respective embodiments described above, the throttle 38 (68) is provided as a flow resistant means within the length of the tank conduit 27 (67) conveying oil flows to the tank. However, for example, the flow resistant means of the invention may be constituted by a constricted portion of the tank conduit 27 (67), the constricted conduit portion having a reduced sectional area to impose an increased resistance to the oil flows therethrough. In such a case, the throttle 38 (68) can be omitted.

Furthermore, although the invention has been described by way of a hydraulic rotational drive circuit for power shovel in the foregoing embodiments, it is to be understood that the invention can be similarly applied to various other inertial body drive mechanisms including hydraulic drive circuits for cranes, rope winches and the like.

POSSIBILITIES OF INDUSTRIAL UTILIZATION

It will be appreciated from the foregoing detailed description that the hydraulic drive mechanism of the present invention is arranged to charge the operating oil in the oil reservoir chamber of the pressurized oil supply means and to hold the Spool of the valve means in the closed position by a biasing means when the selected oil pressures in either one of the first and second main conduits, which are connected to a hydraulic drive motor for an inertial body, exceeds a second predetermined control level, and to supply the operating oil in pressurized state from the oil reservoir chamber of the pressurized oil supply means to an oil chamber of the valve means when the higher operating oil pressure drops below the second predetermined control level, the hydraulic drive circuit having a flow resistant means in a conduit connecting the oil reservoir chamber of the pressurized oil supply means or the oil chamber of the valve means to a tank thereby to impose resistance to discharge oil flows through the tank conduit. Therefore, once the inertial rotation of the hydraulic motor is stopped, pressurized oil is supplied to the oil chamber from the oil reservoir chamber of the pressurized oil supply means as soon as the oil pressure in the oil chamber drops below the afore-mentioned second control level, thereby displacing the spool of the valve means against the action of the biasing means to the open position where the first and second main conduits are communicated with each other to diminish the pressure differential between these conduits.

In this state, the spool is urged toward the oil chamber by the biasing means, and the effluent oil from the oil chamber is discharged to the tank through the flow resistant means with throttling effects thereby prolonging the open time period of the spool to diminish the pressure differential between the first and second main conduits in an assured manner, effectively preventing the reversing motion of the hydraulic motor which would otherwise take place upon stopping its inertial rotation.

In addition, it suffices to provide a single inertial body reversing motion preventive valve or a single valve means between the first and second main conduits, so that the construction as a whole can be simplified and arranged into a compact form.

On the other hand, the valve means which is in the form of a spool valve can provide a relatively large insensitive zone between the closed and open positions of the spool, and the spool is put in a sliding displacement by supplying the operating oil to and from the oil chamber of the valve means by way of the oil reservoir chamber of the pressurized oil supply means, so that fluctuations in driving or braking pressure of the hydraulic motor can be effectively absorbed by the oil reservoir chamber of the pressurized oil supply means, as a result securely preventing the spool from inadvertently opening under direct influence of pressure fluctuations and enhancing the safety and reliability of operations to a marked degree.

Further, in case the hollow cylindrical spool is fitted in the spool sliding bore in the casing and the piston of the pressurized oil supply means is fitted in the spool, it becomes possible to built in the inertial body reversing motion preventive valve in a more compact form. Besides, in the case where the piston of the pressurized oil supply means is received in the spool, the piston can be driven by a pilot section with a small pressure receiving area and this means that the set spring, which determines the second predetermined control pressure level, may be of a smaller spring force. Consequently, the inertial body reversing motion preventive valve can be markedly reduced in size and weight.

What is claimed is:

1. An inertial body drive mechanism of the type including: a hydraulic pressure source; a hydraulic motor adapted to drive an inertial body by charging and discharging oil pressure supplied from said hydraulic pressure source; a switch valve connected to said hydraulic motor through first and second main conduits and switchable from a neutral position to a drive position to supply oil pressure from said hydraulic pressure source to said hydraulic motor, blocking said supply of oil pressure to said hydraulic motor when returned to said neutral position; and a pressure control valve interposed between said first and second main conduits at a position between said switch valve and said hydraulic motor to limit the maximum pressure in said first and second main conduits to a first predetermined control level; and said inertial body drive mechanism further comprising:

a valve means interposed between said first and second main conduits and having a spool adapted to slide between an open position and a closed position for establishing and blocking communication between said first and second main conduits, in combination with a biasing means urging said spool toward said closed position and an oil chamber for sliding said spool from said closed position toward said open position;

a pressurized oil supply means having an oil reservoir chamber of variable volume in communication with said oil chamber of said valve means and adapted to supply oil in said oil reservoir chamber to said oil chamber of said valve means in a pressurized state when said pressure in either said first or said second main conduit, whichever is at a higher level, drops below a second predetermined control level lower than said first control level; and a flow resistant means located within the length of an oil passage connecting either one of said oil reservoir chamber of said pressurized oil supply means and said oil chamber of said valve means to said tank to impose throttle effects on discharge oil flows to said tank.

2. An inertial body drive mechanism as defined in claim 1, further comprising a high pressure selector valve interposed between said first and second main conduits at a position between said switch valve and said hydraulic motor, thereby to select the pressure in said first or second conduit whichever is at a higher level, a pilot chamber provided in said pressurized oil supply means to receive the oil pressure selected by said high pressure selector means as a pilot pressure, said pressurized oil supply means being arranged to suck and store oil in said oil reservoir chamber when said pilot pressure in said pilot chamber exceeds said second control level, and to supply said oil in said oil reservoir chamber to said oil chamber of said valve means after pressurization when said pilot pressure becomes below said second control level.

3. An inertial body drive mechanism as defined in claim 1 or 2, further comprising a check valve provided within an oil bypass conduit in parallel relation with said flow resistant means, said check valve permitting the oil in said tank to flow toward said oil chamber while blocking reverse oil flows.

4. An inertial body drive mechanism as defined in claim 1, wherein said valve means further comprises: a spool sliding bore formed in a casing; a pair of ports formed in said casing in spaced positions in the axial direction of said spool sliding bore in communication with respective ones of said first and second main conduits; said spool being slidably fitted in said spool sliding bore; a throttle passage formed on said spool to establish and block communication between said paired ports; said oil chamber being formed between one end of said spool and said casing and connected to said tank through said oil passage; and a valve spring charged between said other end of said spool and said casing and serving as a biasing means urging said spool toward said oil chamber:

said pressurized oil supply means comprises: a piston sliding bore formed in a casing; a piston slidably fitted in said piston sliding bore; said oil reservoir chamber being formed by said piston at one end of said piston sliding bore in communication with said oil chamber; a set spring provided at the other end of said piston for biasing same toward said oil reservoir chamber with a spring force corresponding to said second predetermined control level; and a pilot pressure section provided at one end of said piston and adapted to slide said piston against said action of said set spring to draw the operating oil into said oil reservoir chamber when the pressure in either said first or second main conduit, whichever is at a higher level, exceeds said second control level; and said valve spring of said valve means being arranged to have a weaker spring force than said set spring of said pressurized oil supply means.

5. An inertial body drive mechanism as defined in claim 4, wherein said valve means and said pressurized oil supply means are built into one and same casing, which casing is provided with said spool sliding bore and said pair of ports of said valve means, along with said piston sliding bore of said pressurized oil supply means, in a position spaced from said spool sliding bore and said ports.

6. An inertial body drive mechanism as defined in claim 4 or 5, further comprising a check valve provided within an oil bypass conduit in parallel relation with said flow resistant means, thereby permitting the operating oil in said tank to flow toward said oil chamber while blocking reverse oil flows.

7. An inertial body drive mechanism as defined in claim 1, wherein said valve means further comprises: a spool sliding bore formed in a casing; a pair of ports formed in said casing in spaced positions in the axial direction of said spool sliding bore and in communication with respective ones of said first and second main conduits; said spool externally defining a cylindrical valve body to be slidably fitted in said spool sliding bore and internally defining a piston sliding bore on the inner periphery thereof; a throttle passage for establishing and blocking communication between said ports in relation with sliding displacement of said spool; said oil chamber being formed between one end of said spool and said casing; and a valve spring serving as a biasing means urging said spool toward oil chamber; and said pressurized oil supply means comprises: a piston slidably fitted in said piston sliding bore in said spool; an oil reservoir chamber formed by said piston at one end of said piston sliding bore in constant communication with said oil chamber; a set spring located between the other end of said piston and said casing to urge said piston constantly toward said oil reservoir chamber with a spring force corresponding to said second preset control level; and a pilot pressure section provided in association with one end of said piston to slide said piston against the action of said set spring to suck oil into said oil reservoir chamber when the pressure in either said first or second main conduit, whichever is at a higher level, exceeds said second preset control level:

said valve spring of said valve means being located between the other end of said spool and said piston and arranged to have a weaker spring force than said set spring.

said pressurized oil supply means comprises: a piston slidably fitted in said piston sliding bore in said spool; an oil reservoir chamber formed by said piston at one end of said piston sliding bore in constant communication with said oil chamber; a set spring located between the other end of said piston and said casing to urge said piston constantly toward said oil reservoir chamber with a spring force corresponding to said second preset control level; and a pilot pressure section provided in association with one end of said piston to slide said piston against the action of said set spring to suck oil into said oil reservoir chamber when the pressure in either said first or second main conduit, whichever is at a higher level, exceeds said second preset control level:

said valve spring of said valve means being located between the other end of said spool and said piston and arranged to have a weaker spring force than said set spring.

8. An inertial body drive mechanism as defined in claim 7, wherein said oil reservoir chamber is located in a position radially inward of said oil chamber between one end of said piston and said casing.

9. An inertial body drive mechanism as defined in claim 7, wherein said throttle passage is bored radially into said spool and constituted by at least one pair of oil holes formed in spaced positions in the axial direction of said spool and an axial oil groove formed on the circumference of said piston in such a manner as to intercommunicate said two oil holes.

10. An inertial body drive mechanism as defined in claim 7, 8 or 9, wherein said pilot pressure section comprises a pusher fitted slidably in one end of said piston, and a pilot chamber formed in said piston in association with said pusher and supplied with oil pressure from either said first or second main conduit, whichever is at a higher pressure level, through said high pressure selector valve.

11. An inertial body drive mechanism as defined in claim 7, 8 or 9 wherein said pilot pressure section comprises a pusher slidably fitted in one end of said casing, and a pilot chamber formed in said casing in association with said pusher and supplied with oil pressure from either said first or second main conduit, whichever is at a higher pressure level, through said high pressure selector valve.

* * * * *